United States Patent
Heckman et al.

(10) Patent No.: US 11,431,740 B2
(45) Date of Patent: Aug. 30, 2022

(54) METHODS AND SYSTEMS FOR PROVIDING AN INTEGRATED ASSESSMENT OF RISK MANAGEMENT AND MATURITY FOR AN ORGANIZATIONAL CYBERSECURITY/PRIVACY PROGRAM

(71) Applicant: Criterion Systems, Inc., Vienna, VA (US)

(72) Inventors: Robert Carl Heckman, Vienna, VA (US); Daniel Keith Chandler, Vienna, VA (US)

(73) Assignee: Criterion Systems, Inc., Vienna, VA (US)

( * ) Notice: Subject to any disclaimer, the term of this patent is extended or adjusted under 35 U.S.C. 154(b) by 722 days.

(21) Appl. No.: 16/227,109

(22) Filed: Dec. 20, 2018

(65) Prior Publication Data

US 2019/0207968 A1  Jul. 4, 2019

Related U.S. Application Data

(60) Provisional application No. 62/612,937, filed on Jan. 2, 2018.

(51) Int. Cl.
*H04L 9/40* (2022.01)
*G06Q 10/06* (2012.01)

(52) U.S. Cl.
CPC ..... *H04L 63/1425* (2013.01); *G06Q 10/0635* (2013.01); *H04L 63/20* (2013.01)

(58) Field of Classification Search
CPC . H04L 63/1433; H04L 63/1425; H04L 63/20; G06Q 10/0635

USPC .......................................................... 726/23
See application file for complete search history.

(56) References Cited

U.S. PATENT DOCUMENTS

| | | | |
|---|---|---|---|
| 8,256,004 B1 | 8/2012 | Hill et al. | |
| 8,782,784 B1 | 7/2014 | Bruskin | |
| 2004/0010709 A1* | 1/2004 | Baudoin | G06Q 40/08 726/1 |
| 2004/0193959 A1* | 9/2004 | Simkins | G06F 11/3688 714/38.1 |
| 2006/0247957 A1* | 11/2006 | Gopfert | G06Q 40/00 705/35 |
| 2007/0271593 A1 | 11/2007 | Sugimoto | |
| 2012/0203590 A1* | 8/2012 | Deb | G06Q 10/0635 705/7.28 |
| 2013/0227697 A1* | 8/2013 | Zandani | G06F 21/57 726/25 |
| 2014/0013431 A1 | 1/2014 | Bush et al. | |

(Continued)

OTHER PUBLICATIONS

NPL Search Terms (Year: 2021).*

(Continued)

*Primary Examiner* — Syed A Zaidi
(74) *Attorney, Agent, or Firm* — The Marbury Law Group, PLLC

(57) ABSTRACT

Embodiments include a computing device with a memory and a processor configured to perform operations including computing a cybersecurity and privacy (CS&P) framework profile (or risk factor) for a cybersecurity program implemented by an enterprise, computing a CS&P maturity level (or maturity factor) for the cybersecurity program, determining an integrated result for the cybersecurity program based at least in part on a combination of the CS&P framework profile and the maturity factor.

18 Claims, 10 Drawing Sheets

(56) References Cited

U.S. PATENT DOCUMENTS

2017/0357982 A1   12/2017  Barday
2018/0018602 A1*  1/2018  DiMaggio .............. G16H 40/20
2018/0124091 A1*  5/2018  Sweeney ............. H04L 63/1425

OTHER PUBLICATIONS

NPL Search Terms (Year: 2022).*
Glantz, Clifford, et al. "Evaluating the maturity of cybersecurity programs for building control systems." US Department of Energy Office of Scientific and Technical Information (2016). (Year: 2016).*
International Preliminary Report on Patentability (Chapter 1 of the Patent Cooperation Treaty) received from the International Bureau of WIPO in related Application No. PCT/US2018/067175 dated Jul. 16, 2020.
International Search Report and Written Opinion received from the Korean Patent Office in related Application No. PCT/US2018/067175 dated Apr. 9, 2019.

* cited by examiner

METHODS AND SYSTEMS FOR PROVIDING AN INTEGRATED ASSESSMENT OF RISK MANAGEMENT AND MATURITY FOR AN ORGANIZATIONAL CYBERSECURITY/PRIVACY PROGRAM

RELATED APPLICATIONS

This application claims the benefit of priority to U.S. Provisional Application No. 62/612,937, entitled "Methods and Systems for Providing an Integrated Assessment of Risk Management and Maturity for a Cybersecurity/Privacy Program" filed Jan. 2, 2018, the contents of which are hereby incorporated by reference for all purposes.

BACKGROUND

Many business organizations develop and use organizational management software solutions to evaluate their internal operations and practices. Such solutions may assess the organization's productivity and compliance with relevant standards, as well as identify inefficiencies, expenses, potential liabilities, and other similar factors. It would be beneficial for these organizational management software solutions to also characterize and evaluate an organization's compliance with information security and privacy standards.

Implementing adequate information security/privacy systems and solutions is a necessary and critical element for conducting business in certain sectors, such as for government agencies. For example, a security operations center (SOC) is generally responsible for detecting, containing and remediating information technology (IT) threats. Organizations that conduct business with governments may require that their SOCs implement a compliance scheme and/or otherwise comply with various industry or government rules regarding cybersecurity and privacy. A cybersecurity framework (CSF) that has been developed by the National Institute of Standards and Technologies (NIST) is an example of a compliance scheme that may be followed voluntarily by organizations to improve their cybersecurity/privacy. Specifically, the NIST CSF provides standards, methodologies, procedures, and processes that align approaches to address cybersecurity/privacy risks. However, the NIST CSF and its implementation details have been changed/updated in the past, and are subject to future revisions, rendering its continuous or permanent use challenging for organizations.

In addition, there are compliance and maturity schemes provided by the annual Federal Information Security Management Act (FISMA) reporting guidance for federal organizations, which are issued annually by the Office of Management and Budget (OMB) and Federal Chief Information Officer (CIO) Council along with annual CIO FISMA Metrics (from the Department of Homeland Security (DHS)) and annual Office of the Inspector General FISMA Reporting Metrics (from Council of IGs on Integrity and Efficiency (CIGIE)). For organizations that must comply with FISMA reporting metrics but also seek to employ a CSF for risk management, implementation may be complicated in view of the interdependency of the programs/systems involved, as well as updates to guidance or other changes that may be issued by NIST, OMB, DHS, OIG, and/or CIGIE.

SUMMARY

Various embodiments include a computing device with a memory and processor configured to perform operations including computing a risk factor for a cybersecurity/privacy program implemented by an enterprise, computing a maturity factor for the cybersecurity/privacy program, and determining an integrated result for the cybersecurity program based at least in part on a combination of the risk factor and the maturity factor. In some embodiments, computing the risk factor may include computing a current risk management level and a target risk management level for the cybersecurity program, and computing the maturity factor may include computing a current maturity level and a target maturity level for the cybersecurity program. In some embodiments, the processor may be configured to perform operations that further include tracking any remediation activities based on the integrated result, and monitoring any changes to the current risk management level or the current maturity level for the cybersecurity/review program.

In some embodiments, computing the risk factor may include determining a current risk management level and target risk management level within each of a plurality of functional areas, and computing the maturity factor may include determining a current maturity level and target maturity level within each of the plurality of functional areas. In some embodiments, the plurality of functional areas may each include a plurality of criteria organized into categories and subcategories.

In some embodiments, the integrated result may include recommendations for improvements to the cybersecurity/privacy program. In some embodiments, computing the risk factor may include identifying applicable criteria within each of a plurality of subcategories, and assigning a weight to the criteria under the plurality of subcategories. In some embodiments, the subcategories may include criteria relevant to risk management. In some embodiments, the subcategories may be divided among a plurality of categories. In some embodiments, a sum of the weights assigned to the subcategories within each category may equal 1. In some embodiments, computing the risk factor may include calculating a risk management level for each category based on a weighted sum of values given to the subcategories within the category.

In some embodiments, computing the maturity factor may include identifying applicable criteria within each of a plurality of subcategories. In some embodiments, subcategories may include criteria relevant to maturity of the cybersecurity program, and the subcategories may be divided among a plurality of categories.

In some embodiments, the processor may be further configured to perform operations that include receiving data input from the enterprise. In some embodiments, computing the risk factor and computing the maturity factor may be based at least in part on the received data input. In some embodiments, the received data input may include information including at least one of cybersecurity documentation, technical vulnerability assessment results, operational and environmental constraints, or interview responses by personnel of the enterprise.

Further embodiments may include methods of providing an assessment of risk management and maturity for a cybersecurity/privacy program corresponding to the processor operations summarized above. Further embodiments may include a non-transitory processor-readable medium on which is stored processor-executable instructions configured to cause a processor of a computing device to perform any of the operations described above. Further embodiments may include a computing device having means for performing any of the functions of the computing device described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
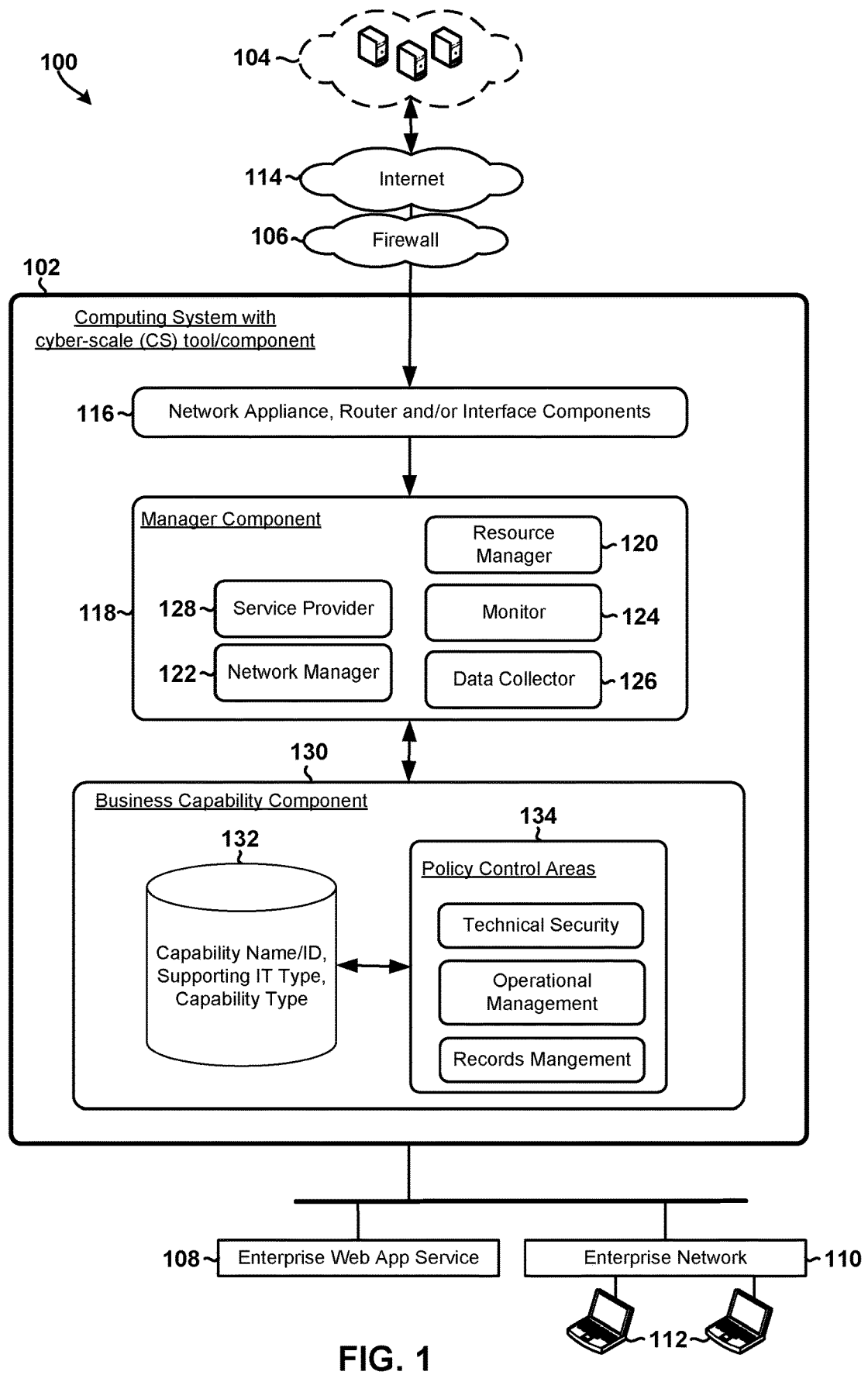
FIG. 1 is a block diagram illustrating components and information flows in an embodiment system that is configured to protect an enterprise network and its devices in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices configured to implement the methods, for characterizing and evaluating aspects of an organization, enterprise or system, such as a cybersecurity/privacy program that is implemented by an enterprise. Various embodiments may include computing devices that are equipped an organizational management software system and/or a cyber-scale (CS) tool or component that is configured to survey, evaluate, analyze, document, manage, and enhance a cybersecurity and privacy (CS&P) program, project, operation, and/or system (herein collectively "CS&P program") of an organization, enterprise, or agency (herein collectively "organization").

In some embodiments, the computing device may be configured to evaluate an enterprise's cybersecurity program by computing a CS&P framework profile (or risk factor, risk score, risk level, threat value, etc.) for the cybersecurity/privacy program, computing a CS&P maturity factor for the cybersecurity/privacy program, and generating an integrated result based on a combination of the computed CS&P framework profile and the computed CS&P maturity factor. The computing device may generate recommendations for improvements to the cybersecurity/privacy program based on the integrated result. The computing device may also use the integrated result to monitor and/or track remediation activities and/or any resulting changes to current risk management level or current maturity level. The computing device may determine whether the changes are positive/negative and/or whether the cybersecurity/privacy program has achieved, is progressing toward, a target risk management level and/or a target maturity level.

The phrase "computing device" may be used herein to refer to any one or all of server computing devices, personal computers, mobile devices, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, and similar electronic devices that include a programmable processor.

The phrase "application server" may be used herein to refer to a software framework that provides both the facilities to create a web-based application and a server environment to run the web applications.

The phrase "web application server" may be used in this application to refer to a component (e.g., a server computing device, a cluster of server computing devices, a process executing on a server computing device, etc.) that provides the facilities to create a web-based application and/or a server environment to run the web applications. In some embodiments, a web application server may be a server computing device that includes processing capabilities, storage capabilities, and networking capabilities. The networking capabilities may include network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi router, etc.). The processing capabilities may include a hardware processor that is configured with processor executable instructions to perform, execute, or run web applications or application servers. A web application server may also be configured to offer or provide a specific suite of services to client computing device ("users").

The phrase "risk management framework" may be used in this application to refer to a system or component that implements various policies and/or standards to accomplish a disciplined and structured operating or development approach that integrates aspects of an information security solution with those of a risk management solution.

The phrase "maturity model" may be used in this application to refer to a component, object and/or information structure that includes information (e.g., decision criteria, measurements, values, variables, etc.) suitable for assessing one or more qualities of a technology, device, software application, process, or organization. For example, a maturity model may be used to measure, evaluate, quantify, and compare the ability of an organization to improve in a particular area or discipline over time. Generally, the higher the maturity (level or value), the higher the chances that incidents, events, exceptions or errors will be detected, analyzed and corrected in a matter that will qualitatively improve the program/system's features, characteristics, operations, abilities or capabilities in subsequent iterations and/or over time.

Generally, a framework core is a set of cybersecurity activities, desired outcomes, and applicable references that are common across critical infrastructure sectors and/or organizational levels. A framework profile represents the cybersecurity/privacy outcomes based on business needs that an organization has selected from framework categories and subcategories. The framework profile may be characterized as the alignment of standards, guidelines, and practices to a framework core in a particular implementation scenario. Framework profiles may be used to identify opportunities for improving cybersecurity/privacy posture by comparing a "current" profile (the as-is state) with a "target" profile (the to-be state). To develop a framework profile, an organization can review all of the categories and subcategories and, based on business drivers and a risk assessment, determine which are most important. They can also add categories and subcategories as needed to address specific organization's risks. A "current framework profile" may then be used to support prioritization and measurement of progress toward the "target framework profile," while factoring in other business needs including cost-effectiveness and innovation. The framework profile may be used to conduct self-assessments and communicate within an organization or between organizations.

In some embodiments, the CS tool/component may be configured to enhance the efficiency and effectiveness of the organization's CS&P program.

In some embodiments, the CS tool/component may be configured to evaluate the overall management, operational, and technical readiness levels of a organization's CS&P program.

In some embodiments, the CS tool/component may be configured to evaluate, quantify and/or determine the current status of a particular process, sub-system, domain, or function of the organization's CS&P program, and generate output in the form of status information, analysis data and recommendations for the future improvements.

In the various embodiments, the CS tool/component may be configured to review current and projected future CS&P capabilities of an organization, compare the current CS&P capability levels against future requirements/needs, and use the results of the comparison to generate a strategic/tactical roadmap, corrective action plan, and/or project plan. The generated roadmap or plan may include prioritized goals, objectives, and milestones to create the desired outcomes and performance metrics for each of a plurality of functional areas or framework cores.

In some embodiments, the CS tool/component may be configured to combine a cyber-operations maturity model, including government guidance for organizations, with a risk management cybersecurity framework. The government guidance for organizations may include FISMA enhanced guidance issued annually by OMB, DHS, OIG, and/or CIGIE. The risk management cybersecurity/privacy framework may also be consistent with government-issued guidance, such as the NIST CSF.

In some embodiments, the CS tool/component may be configured to provide an organization with a snapshot of the organization's risk management level in light of its current maturity, as well as a roadmap for future actions based on the organization's goals.

In some embodiments, the CS tool/component may be configured to support an ongoing evaluation or review of an organization's cybersecurity and privacy programs/projects.

In some embodiments, the CS tool/component may be configured to analyze, evaluate and/or determine current and desired risk management levels and/or maturity model levels based on applicable requirements, guidance, and/or criteria.

In some embodiments, the CS tool/component may be configured to generate or determine an "ideal state" that provides a target against which a well-resourced cybersecurity and privacy program or project may set goals.

In some embodiments, the CS tool/component may be configured to enable comparison of the organizational cybersecurity and privacy program/project with the ideal state.

As part of implementing the CS tool/component, the organization's existing cybersecurity/privacy program may be evaluated with respect to a plurality of functional areas, core areas or framework cores (herein "core areas"). In some embodiments, the CS tool/component may be configured to map detected or sample CS&P functions to the core areas (e.g., core functions of the NIST CSF, etc.) along with special programs. The core areas may each include a plurality of categories, which may each be further made up of a plurality of subcategories.

In some embodiments, the core areas may include an identify core area, a protect core area, a detect core area, a respond core area, and a recover core area, any or all which may be represented via one or more categories, information units, information structures (e.g., maps, tables, columns, etc.), numeric or symbolic values, attributes, parameters, data fields, etc. The identify core area may cover, characterize or represent the development of the organizational understanding to manage CS&P risk to information systems, assets, data, and capabilities. The protect core area may cover, characterize or represent the development and implementation of the appropriate safeguards to ensure delivery of critical information technology services. The detect core area may cover, characterize or represent the development and implementation of the appropriate activities to identify the occurrence of a CS&P event. The respond core area may cover, characterize or represent the development and implementation of the appropriate activities to take action regarding a detected CS&P event. The recover core area may cover, characterize or represent the development and implementation of the appropriate activities to maintain plans for resilience and to restore any capabilities or services that were impaired due to a CS&P event.

The CS tool/component may provide functions, services and/or output that enables organizations to determine the activities that are important to their critical service delivery, determine applicable CS&P goals and objectives, prioritize investments to maximize the impact of each dollar spent, optimize all or portions of a CS&P program, and implement a flexible roadmap that may be used to continuously improve the organization's overall CS&P program, such as via the adoption and/or adaptation of new tools, technologies, processes, procedures, staffing, training, etc.

In various embodiments, the CS tool/component may provide a repeatable and measurable process by which an organization may measure its risk management level over time, and to ensure that its maturity level is properly aligned based upon the organization's stated and/or approved risk tolerance/appetite. Specifically, the risk framework profile may use various risk management level determinations to compute an overall CS&P framework profile (or overall risk factor), referred to as the risk framework profile score.

The CS tool/component may be configured to use a maturity model and/or various maturity level determinations to develop an overall maturity factor, referred to as the maturity model score. The maturity model may consider and incorporate the effectiveness of the organization's cybersecurity/privacy program or project on a spectrum in which foundation levels ensure that the organization develops sound cybersecurity/privacy policies and procedures. The maturity model may include declarative statements and information that may be used to determine whether an organization's cybersecurity/privacy policies, processes, procedures, and associated behaviors support various levels across the core areas, as well as across a number of categories and subcategories ("domains"). Within each domain, the declarative statements and information may describe activities supporting the review criteria at each maturity level. In various embodiments, a reviewer may assign a statement that best fits the current cybersecurity/privacy practices of the organization based upon the information collected. It is noted that, in some embodiments, the functions performed by a reviewer, assessor or the like may be performed by a component or computer-implemented processes, such as by a processor configured to implement various machine-learning modules.

Various embodiments may include a computing system equipped with multiple components that are configured to work in conjunction with one another to implement an automated supervised learning system. The automated supervised learning system may allow the computing device to learn behavior patterns with respect to multiple organizations, and use the learned patterns when assessing a particular organization. Examples of such use may include identifying relevant subcategories and weights thereof within a risk framework profile or risk level for the organization, extracting applicable input about the organization for a maturity model, developing recommendations that are in line with the organization's existing resources, etc. In addition, the automated supervised learning system may allow the computing device to intelligently filter the types of information that are analyzed by the CS tool/component.

FIG. 1 illustrates various components and communication links in a system 100 that includes a computing system 102 that is configured to implement the CS tool/component in accordance with the various embodiments. In the example illustrated in FIG. 1, the system 100 includes network servers 104, firewall 106, the computing system 102, enterprise web application service or servers 108, and an enterprise network 110 to which client devices 112 may connect. The network servers 104 may include any remote server that could be accessed via the Internet 114, such as by applications running on client devices 112. The firewall 106 may be any of a number of well-known security components used to protect networks and computing systems (e.g., 102).

The computing system 102 may be deployed within an organization (i.e., an enterprise system) and/or may be implemented via an enterprise server. In the example illustrated in FIG. 1, the computing system includes standard network appliance, router and/or interface components 116 that are configured to receive incoming data packets from the network server 104, direct incoming data packets to the addressed client devices 112 via the enterprise network 110, receive outgoing data packets from client devices 112 via the enterprise network 110, and relay the outgoing data packets via the Internet 114.

The computing system 102 may include a manager component 118 that is configured to supervise operations of enterprise network 110, manage resources, and collect data regarding network operations. The manager component 118 may include a resource manager 120 configured to keep track of resources of the computing system 102 and the enterprise network 110, and manage their utilization by various components and client devices 112. The manager component 118 may also include a network manager 122 configured to manage operations of the enterprise network 110. The manager component 118 may also include a monitor component 124 configured to monitor data flows and access requests within computing system 102 and the enterprise network 110 and provide such information to the resource manager 120, the network manager 122 and/or a data collector 126 that is configured to save data regarding network operations. The manager component 118 may also include a service provider 128 configured to supervise the provision of services to other devices (e.g., client devices 112, etc.) via the enterprise network 110, including services provided by the enterprise web application service 108. In some embodiments, the enterprise web application service 108 may be implemented by, or included within, the computing system 102.

The computing system 102 may also include a business capability component 130 that is configured to provide particular assets and processes that a compliance manager may manage in the organization. The term "business capability" may describe a particular combination of assets and processes. The business capability component 130 may include information 132 identifying each capability by a name or other identifier, a supporting IT type, and a capability type (e.g., sub-system, application, or infrastructure). The business capability component 130 may also map each capability to a particular policy control area 134, which may form the basis of standards and procedures. Examples of different policy control areas 134 include, but are not limited to, management, operational, and technical cybersecurity/privacy functions. In various embodiments, a policy control area may define security roles and responsibilities, the scope of information to be protected, and provides a high-level description of the controls that are to be in place to protect the information. Moreover, the policy control area may make references to the standards that support the policy, and the procedures used to carry out the standards.

The manager component 118 may be configured to instrument components at various levels of the enterprise web application (app) server 108 or services. The manager component 118 may monitor activities of other devices (e.g., client devices 112, etc.) and collect activity information, such by reading information stored in a log file that is stored in a memory of a client computing device 112. The manager component 118 may communicate with the business capability component 130. The manager component 118 may also include components that monitor certain technical activities of the organization as a whole to collect technical activity information, use the technical activity information to generate feature vectors, apply the feature vectors to models, generate analysis results, use the analysis results in assigning various risk management level scores in one or more domain within the CS tool/component, and utilize the input data as training for further supervised learning. That is, the manager component 118 may be configured to perform various behavior-based machine learning operations.

In some embodiments, the manager component 118 may include components that collect, receive or generate data inputs. The data inputs may include cybersecurity and privacy documentation review results, technical vulnerability assessment, blue team assessment, red team assessment, penetration testing team results, operational environmental description constraints, targeted interview responses by personnel of the organization, and other similar information.

As described, the CS tool/component of the computing system 102 provides a repeatable and measurable process for an organization (or computing devices operated by the organization, the enterprise web application server 108, a client computing device 112, etc.) to measure its cybersecurity/privacy risk framework profile or risk level (e.g., a value between 0 and 4 represented via various RISK_VALUE fields, and described in more detail below) over time and to ensure that its organizational maturity level (e.g., a value between 1 and 5 represented via various MATURITY_VALUE fields, and described in more detail below) is properly aligned based upon the organization's stated and/or approved risk tolerance/appetite or risk management levels.

The first element of the CS tool/component, the cybersecurity/privacy risk framework profile or risk level may quantify, consider and/or incorporate cyber threats directed at the organization; the type, volume, the complexity of the organization's mission, business, and operations; and the current implemented security controls. As described below, the cybersecurity/privacy risk framework profile or risk level may identify a risk management level across a number of domains: subcategories; categories (comprised of multiple subcategories); and core areas (comprised of multiple categories).

In various embodiments, the CS tool/component may, based on collected information and initial reviews, assign a "subcategory risk management level value" (e.g., SC_RISK_ VALUE, etc.) for each of various subcategories that have been designated or selected as relevant for the organization.

In various embodiments, each subcategory may also be associated with a particular weight (e.g., SC_WEIGHT_VALUE, etc.) based on information about the organization. Using the weights and values of various subcategories (e.g., SC1_RISK_VALUE and SC1_WEIGHT_VALUE, etc.), the CS tool/component may determine or calculate a "category risk management level value" (e.g., C_RISK_VALUE, etc.) for each category.

In some embodiments, each category may also be associated with a particular weight (e.g., C_WEIGHT_VALUE, etc.), which may be determined based on information from or about the organization.

Using the scores computed for various categories, as well as any further weights provided, the CS tool/component may calculate a "core area risk management level value" (e.g., CA_RISK_VALUE, etc.) for each for each core area. For example, the CS tool/component may be configured to generate an IDENTIFICATION_RISK_VALUE, a PROTECTION_RISK_VALUE, a DETECTION_RISK_VALUE, a RESPONSE_RISK_VALUE, and a RECOVERY_RISK_VALUE, each of which may be a CA_RISK_VALUE.

The CS tool/component may calculate a roll-up risk value for each category and core area, as well as the overall CS&P program.

In this manner, risk framework profile or risk level values across the core areas may be generated and used to evaluate the organization and/or its programs.

In some embodiments, an overall risk framework profile or risk level score (e.g., OVERALL_RISK_VALUE, etc.) may be determined by the CS tool/component based on a calculated roll-up risk value average or the most frequently occurring calculated core area risk management level values among the core areas, as required by the user/client.

In an example, the risk management level values may range from level 0 to level 4, which may be defined by elements including, but not limited to, the following descriptions:

Level 0—Nonexistent: The organization does not use this function or does not deem it as necessary.

Level 1—Partial: organizational cybersecurity risk management practices are not formalized, and risk is managed in an ad hoc and sometimes reactive manner. Prioritization of cybersecurity activities may not be directly informed by organizational risk objectives, the threat environment, or business/mission requirements. There is limited awareness of cybersecurity risk at the organizational level. The organization implements cybersecurity risk management on an irregular, case-by-case basis due to varied experience or information gained from outside sources. The organization may not have processes that enable cybersecurity information to be shared within the organization. The organization does not understand its role in the larger ecosystem with respect to its dependencies and dependents. A organization may not have the processes in place to participate in coordination or collaboration with other entities. The organization does not collaborate with or receive information (e.g., threat intelligence, best practices, technologies) from other entities (e.g., buyers, suppliers, dependencies, dependents, ISAOs, researchers, governments), nor does it share information. The organization is generally unaware of the cyber supply chain risks of the products and services it provides and that it uses. A organization may not understand the full implications of cyber supply chain risks or have the processes in place to identify, assess and mitigate its cyber supply chain risks.

Level 2—Risk Informed: Risk management practices are approved by management but may not be established as organizational-wide policy. Prioritization of cybersecurity activities is directly informed by organizational risk objectives, the threat environment, or business/mission requirements. There is an awareness of cybersecurity risk at the organizational level, but a organization-wide approach to managing cybersecurity risk has not been established. Cybersecurity information is shared within the organization on an informal basis. Consideration of cybersecurity in mission/business objectives may occur at some levels of the organization, but not at all levels. Cyber risk assessment of organizational and external assets occurs but is not typically repeatable or reoccurring. The organization knows its role in the larger ecosystem with respect to its own dependencies or dependents, but not both; but has not formalized its capabilities to interact and share information externally. The organization collaborates with and receives some information from other entities and generates some of its own information but may not share information with others. Additionally, the organization is aware of the cyber supply chain risks associated with the products and services that either supports the business mission function of the organization or that are utilized in the organization's products or services but does not act consistently or formally upon those risks. The organization has not formalized its capabilities to manage cyber supply chain risks internally or with its suppliers and partners and performs these activities inconsistently.

Level 3-Repeatable: The organization's risk management practices are formally approved and expressed as policy. Organizational cybersecurity practices are regularly updated based on the application of risk management processes to changes in business/mission requirements and a changing threat and technology landscape. There is an organization-wide approach to manage cybersecurity risk. Risk-informed policies, processes, and procedures are defined, implemented as intended, and reviewed. Consistent methods are in place to respond effectively to changes in risk. Personnel possess the knowledge and skills to perform their appointed roles and responsibilities. The organization consistently and accurately monitors cybersecurity risk of organizational assets. Senior cybersecurity and non-cybersecurity executives communicate regularly regarding cybersecurity risk.

Senior executives ensure consideration of cybersecurity through all lines of operation in the organization. The organization understands its role, dependencies, dependents, and partners in the larger ecosystem, receives information from these partners that enables collaboration and risk-based management decisions within the organization in response to events, and may contribute to the community's broader understanding of risks. The organization collaborates with and receives information from other entities regularly that enables, complements internally generated information, and shares information with other entities. The organization is aware of the cyber supply chain risks associated with the products and services it provides and that it uses. A organization-wide approach to managing cyber supply chain risks is enacted via enterprise risk management policies, processes and procedures. This likely includes a governance structure (e.g. Risk Council) that manages cyber supply chain risks in balance with other enterprise risks. Policies, processes, and procedures are implemented consistently, as intended, and continuously monitored and reviewed. Personnel possess the knowledge and skills to perform their appointed cyber supply chain risk management responsibilities. The organization has formal agreements in place to communicate baseline requirements to its suppliers and partners.

Level 4—Adaptive: The organization adapts its cybersecurity practices based on previous and current cybersecurity activities, including lessons learned and predictive indicators. Through a process of continuous improvement incorporating advanced cybersecurity technologies and practices, the organization actively adapts to a changing threat and technology landscape and responds in a timely and effective manner to evolving, sophisticated threats. There is an organization-wide approach to managing cybersecurity risk that uses risk-informed policies, processes, and procedures to address potential cybersecurity events. The relationship between cybersecurity risk and organizational mission/business objectives is clearly understood and considered when making decisions. Senior executives monitor cybersecurity risk in the same context as financial risk and other organizational risks. The organizational budget is based on understanding of current and predicted risk environment and future risk appetite/tolerances. Business units implement executive vision and analyze system level risks in the context of the organizational risk appetite/tolerances. Cybersecurity risk management is part of the organizational culture and evolves from an awareness of previous activities, information shared by other sources, and continuous awareness of activities on their systems and networks. Cybersecurity risk is clearly articulated and understood across all strata of the enterprise. The organization can quickly and efficiently account for changes to business/mission objectives and threat and technology landscapes in how risk is approached and communicated. It receives, generates, and reviews prioritized information that informs continuous analysis of its risks as the threat and technology landscape evolves. The organization understands its role, dependencies, and dependents in the larger ecosystem; manages risk; and contributes to the community's broader understanding of risks by actively sharing information with internally and externally with partners and other collaborators to ensure that accurate, current information is being distributed and consumed to improve cybersecurity before a cybersecurity event occurs. The organization uses real-time or near real-time information to understand and consistently act upon cyber supply chain risks associated with the products and services it provides and that it uses. The organization can quickly and efficiently account for emerging cyber supply chain risks using real-time or near real-time information and leveraging an institutionalized knowledge of cyber supply chain risk management with its external suppliers and partners as well as internally, in related functional areas and at all levels of the organization. The organization communicates proactively and uses formal (e.g. agreements) and informal mechanisms to develop and maintain strong relationships with its suppliers, partners, and individual and organizational buyers.

In some embodiments, the selection of subcategories, assignment of risk management level values, and determination of associated weights under various categories may be identified for both current (e.g., as-is or AI) and target/desired (e.g., to-be or TB) operations of the organization's cybersecurity/privacy program. Therefore, the CS tool/component may generate scores for both a current and target risk framework profile or risk level. For example, the CS tool/component may generate both a AI_OVERALL_RISK_VALUE and a TB_OVERALL_RISK_VALUE for an organization being evaluated.

The second element of the CS tool/component, the cybersecurity/privacy maturity model, also provides maturity level values across a plurality of domains—that is, within various subcategories, categories, and core areas.

In various embodiments, the CS tool/component may assign a maturity level value (e.g., a value between 1 and 5 represented via various MATURITY_VALUE fields, and described in more detail below) for each of various subcategories that have been designated or selected as relevant for the organization. The CS tool/component may determine a maturity level for a category based on the most frequently occurring maturity level value among designated or selected subcategories within the category. Similarly, the CS tool/component may determine a maturity level for a core area based on a calculated roll-up maturity value average or based on most frequently occurring maturity level determined among its categories as required by the user/client. For example, the CS tool/component may be configured to generate an IDENTIFICATION_MATURITY_VALUE, a PROTECTION_MATURITY_VALUE, a DETECTION_MATURITY_VALUE, a RESPONSE_MATURITY_VALUE, and a RECOVERY_MATURITY_VALUE. In this manner, maturity model scores across the core areas may be generated.

In some embodiments, an overall maturity model score (e.g., OVERALL_MATURITY_VALUE, etc.) may be determined by the CS tool/component based on a calculated roll-up maturity value average or based on the most frequently occurring maturity level determined among the core areas as required by the user/client.

In one example, maturity levels may range from level 1 to level 5, which may be defined as follows:

Level 1—Ad hoc: Policies, procedures, and strategy are not formalized; activities are performed in ad-hoc, reactive manner.

Level 2—Defied: Policies, procedures, and strategy are formalized and documented but not consistently implemented.

Level 3—Consistently Implemented: Policies, procedures, and strategy are consistently implemented, but quantitative and qualitative effectiveness measures are lacking.

Level 4—Managed and Measurable: Quantitative and qualitative measures on the effectiveness of policies, procedures, and strategy are collected across the organization and used to assess them and make necessary changes.

Level 5—Optimized: Policies, procedures, and strategy are fully institutionalized, repeatable, self-generating, consistently implemented, and regularly updated based on a changing threat and technology landscape and mission/business needs.

In some embodiments, the selection of subcategories and assignment of maturity levels may be identified for both the current (e.g., as-is or AI) and desired (e.g., to-be or TB) operations of the organization's cybersecurity/privacy program. Therefore, the CS tool/component may generate scores for both current and aspirational maturity models. For example, the CS tool/component may be configured to generate a AI_IDENTIFICATION_MATURITY_VALUE and a TB_IDENTIFICATION_MATURITY_VALUE. Similarly, the system may be configured to generate a AI_OVERALL_MATURITY_VALUE and a TB_OVERALL_MATURITY_VALUE.

In some embodiments, once the CS tool/component has been used to generate results using the combination of the cybersecurity/privacy risk framework profile or risk level (e.g., OVERALL_RISK_VALUE, etc.) and maturity model (e.g., OVERALL_MATURITY_VALUE, etc.), re-evaluation processes may be performed to ensure that the relationship between these two portions is correctly calibrated within the CS tool/component.

Such review and/or varication may be performed periodically. For example, such re-evaluation may be performed in response to changes that are anticipated to affect the organization's overall risk framework profile or risk level score (e.g., OVERALL_RISK_VALUE, etc.), such as new threats arising, planning of significant changes within the organization, entering new third-party relationships, etc. In this manner, the organization may determine whether additional cybersecurity/privacy practices or security controls are needed to maintain or augment the organization's overall score for its current or target maturity model (e.g., the AI_OVERALL_MATURITY_VALUE or the TB_OVERALL_MATURITY_VALUE, etc.) based on changes in risk management levels.

Figure 2:
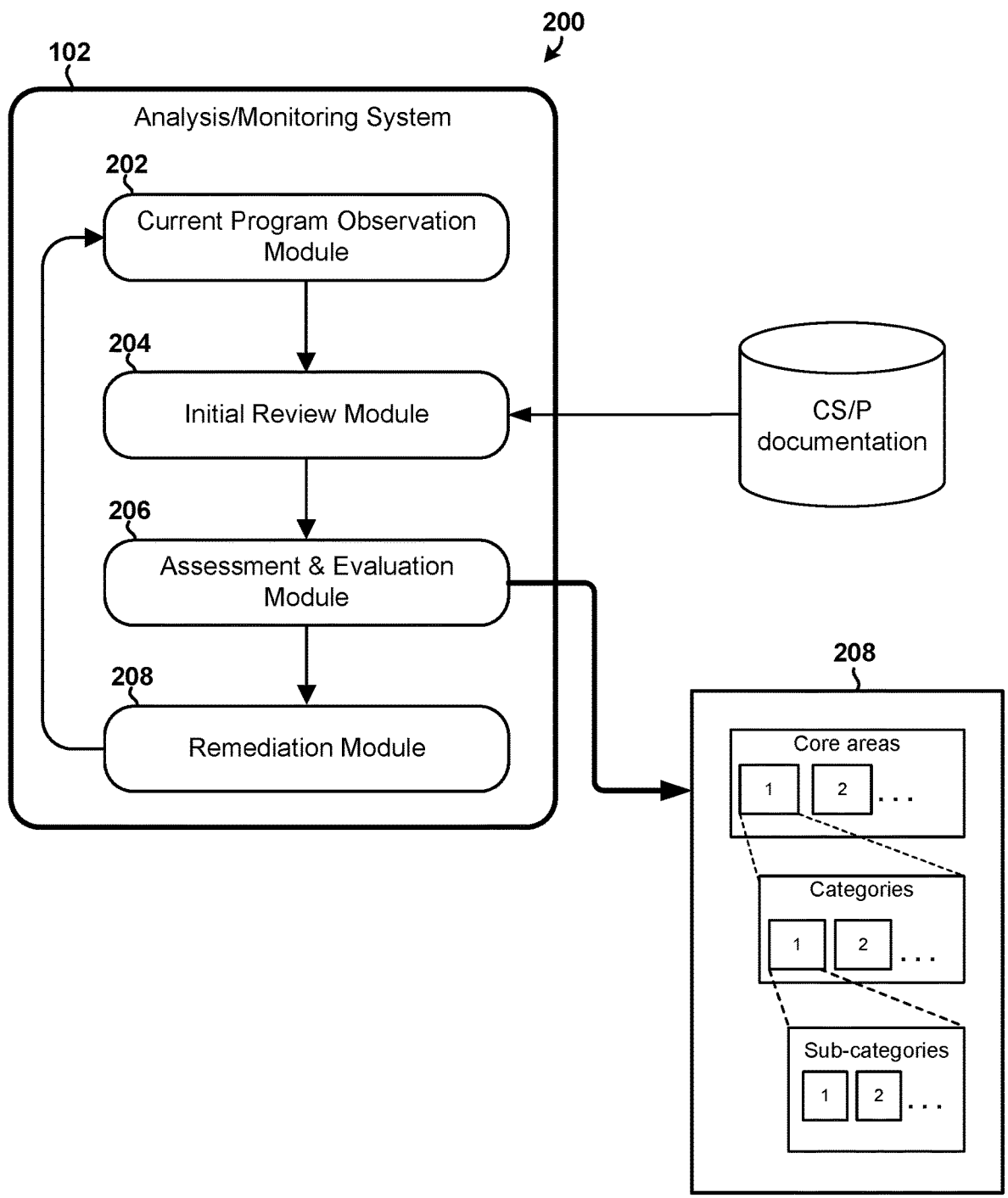
FIG. 2 is a block diagram illustrating example logical components and information flows in a data-based analysis and monitoring system implemented by an enterprise computing device in accordance with various embodiments.

FIG. 2 illustrates an example of a data-based analysis and monitoring system 200 that may be implemented in a computing device or server, and configured to work in conjunction with the CS tool/component. In the example illustrated in FIG. 2, the computing device 102 may be an enterprise server that includes at least one device processor configured with executable instruction modules/components that include, for example, a current program observation component 202, an initial review component 204, an analysis and evaluation component 206, and a remediation component 208. Each of the components 202-208 may be a thread, process, daemon, module, sub-system, or component that is implemented in software, hardware, or a combination thereof. In various embodiments, the components 202-208 may be implemented within parts of the operating system (e.g., within the kernel, in the kernel space, in the user space, etc.), within separate programs or applications, in specialized hardware buffers or processors, or any combination thereof. In an embodiment, one or more of the components 202-208 may be implemented as software instructions executing on one or more processors of the mobile computing device 102.

The current program observation component 202 may be configured to retrieve and provide information reflecting the organization's existing cybersecurity/privacy program. The current program observation component 202 may access the organization's business/mission objectives, high-level organizational priorities, strategic decisions regarding cybersecurity/privacy implementations, and the scope of systems and assets that support the current mission/business. In some embodiments, the current program observation component 202 may be configured to identify primary and alternate key personnel contacts and supporting documentation based on the defined review scope. The current program observation component 202 may also retrieve any previous cybersecurity/privacy recommendations, remediation plans, or other results from previous reviews. Thus, the current program observation component 202 may provide a to-date summary (e.g., a vector or other information structure that includes the collected and analyzed information in a summary format, etc.) of the current scope of the organization's cybersecurity/privacy program or project, the related systems and assets, regulatory requirements, and overall risk approach, along with threats and vulnerabilities applicable to those systems and assets.

Information from the current program observation component 202 (e.g., the to-date summary, etc.) may be output to the initial review component 204, which may be invoked by the CS tool/component to when preparing to perform a new or updated review of a cybersecurity/privacy program or project for the organization. In some embodiments, the initial review component 204 may access cybersecurity/privacy data collected by the organization, including supporting documentation, background data, listings of key personnel, etc. In various embodiments, the interview review component 204 may perform various operations and tasks such as conducting documentation reviews, generating targeted questions to various personnel, collecting and reviewing responses, and performing a technical vulnerability assessment or review. In some embodiments, the technical vulnerability assessment may involve conducting compliance scans, vulnerability scans, configuration audits, and/or penetration testing, as needed.

The initial review component 204 may generate initial review results from the documentation review. The initial review results may be provided to the analysis and evaluation component 206. In various embodiments, the analysis and evaluation component 206 may utilize the CS tool/component as described to generate current and target cybersecurity/privacy risk framework profile or risk level (e.g., AI_OVERALL_RISK_VALUE, TB_OVERALL_RISK_VALUE, etc.) and maturity model scores (e.g., AI_OVERALL_MATURITY_VALUE, TB_OVERALL_MATURITY_VALUE, etc.).

In various embodiments, generating the risk framework profile and maturity model may be based on computed risk management level values and maturity levels for each functional program at the core, category, and subcategory levels. In some embodiments, the analysis and evaluation component 206 may output a comprehensive report 210 containing these values, the overall current and target risk framework profile and maturity model scores, and set of cybersecurity/privacy organizational recommendations with specific mitigation strategies.

The comprehensive report 210 and/or information relating to the recommendation and mitigation strategies may be provided to the remediation component 208, which may implement a corrective action plan. In various embodiments, implementing the corrective action plan may involve monitoring the current practices against the target cybersecurity/privacy risk framework profile and maturity model, and providing feedback and updates to the current program, which may be accessed by the current program observation component 202.

The CS tool/component according to various embodiments may provide an operational review of an organization's cybersecurity/privacy program or project, determine the applicable cybersecurity/privacy risk framework profile and maturity level scores, analyze the findings, and create algorithms, procedures, or plans to implement the improvements to appropriate cybersecurity/privacy policies, processes and activities. The tool/component may further support this improvement process by collecting, manipulating, recording, and displaying applicable data, which enables an organization to proactively manage and optimize cybersecurity/privacy operations within various functional areas. Ultimately, the CS tool/component allows an organization to reduce and better managing local and organizational cybersecurity/privacy risks while maturing the organization's overall cybersecurity/privacy program.

Figure 3:
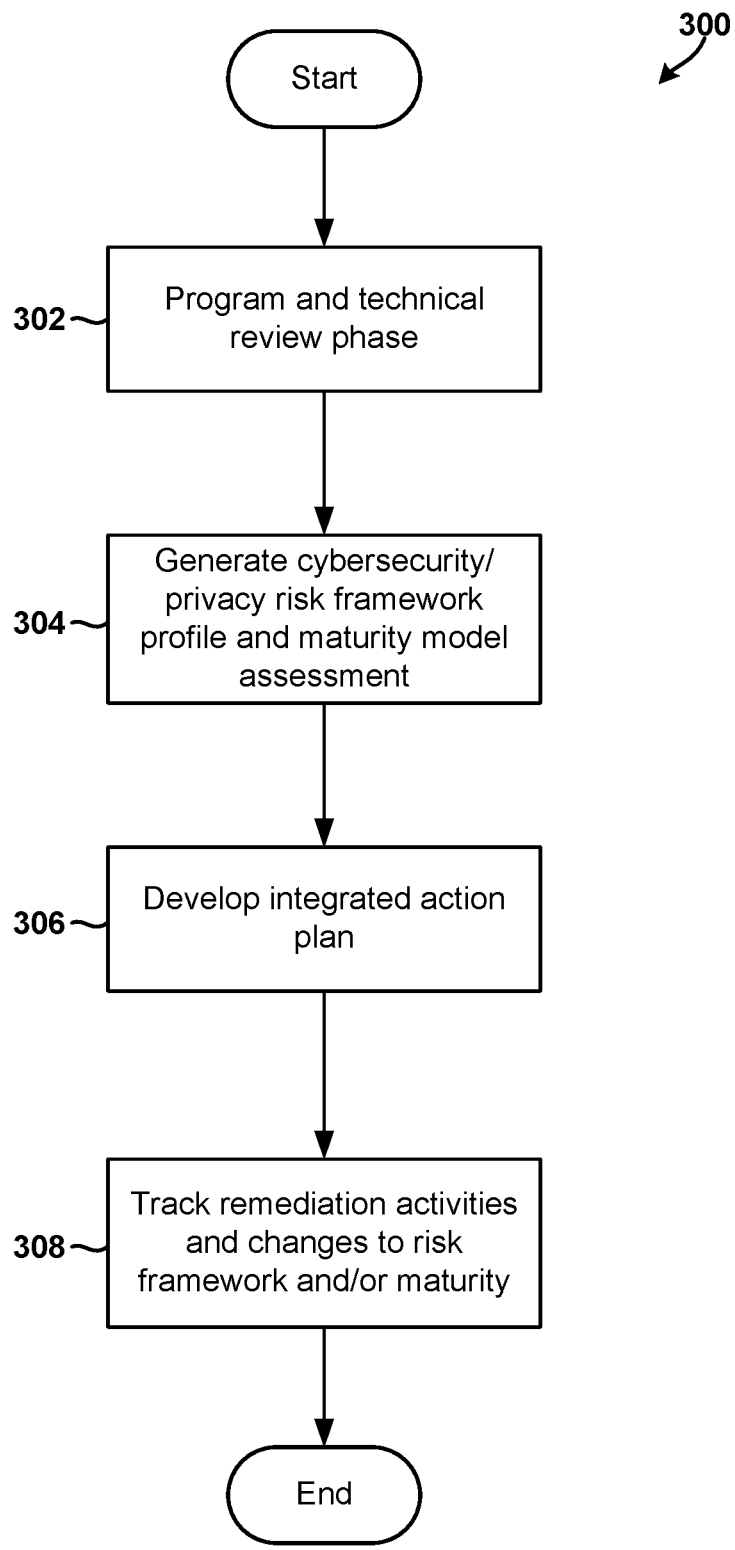
FIG. 3 is a process flow diagram illustrating a method of implementing a cyber-scale (CS) tool/component by an enterprise system in accordance with various embodiments.

FIG. 3 illustrates illustrating a method 300 by which an organization may implement a CS tool/component according to an embodiment. The method 300 may be performed by a processor or processing core of one or more computing device within the organization (i.e., an enterprise system). In various embodiments, the processor or processing core may perform the method 300 by implementing component/module(s) of the analysis and monitoring system 200. In some embodiments, steps of the method 300 may be performed by the enterprise system through human operator input and/or machine learning (e.g., provided via the manager component 118 illustrated in FIG. 1).

In block 302, the enterprise system (or CS tool/component, etc.) may perform a program and technical review phase for an existing cybersecurity/privacy program or project. In some embodiments, the program and technical review phase may involve collecting data in order to customize the CS tool/component and provide sufficient information for execution. Specifically, the program and technical review phase may include one or more of verifying and validating the organization's need for the review, and setting forth overall objectives for a CS tool/component deployment. To complete the program and technical review phase, the enterprise system may perform steps including identifying, collecting, and reviewing the organization's cybersecurity/privacy documentation (e.g., policies, plans, processes, procedures, standard operating procedures, previous risk assessments, etc.). Further, the enterprise system may identify, collect, and review any applicable new information system development.

In conducting the program and technical review phase, the enterprise may integrate the applicable organizational cybersecurity/privacy stakeholders into the information gathering process by querying input and/or feedback. Further elements of the program and technical review phase may include interviewing organizational cybersecurity/privacy personnel, conducting technical vulnerability assessment(s) and reviews, and performing a gap analysis. In some embodiments, the enterprise may conduct the interview using factors related to the detailed CS tool/component as a guide in order verify and validate information, fill in missing information, and to resolve any information conflicts. In various embodiments, the enterprise may implement the program and technical review in a manner that minimizes the impact of the review on necessary cybersecurity/privacy operations.

In block 304, the enterprise system may generate a cybersecurity/privacy risk framework profile and a maturity model assessment. In various embodiments, the assessment may be generated using the CS tool/component, as described in further detail below with respect to FIGS. 4A and 4B.

In block 306, the enterprise system may develop an integrated action plan for the organization using the generated cybersecurity/privacy risk framework profile and a maturity model assessment. In some embodiments, initial findings that are first output in a draft report. In some embodiments, applicable functional area managers in the organization may be briefed on the initial findings regarding the integrated action plan. In this manner, any changes or feedback may be incorporated as required, and the final integrated action plan may be presented to the organization. Detailed roadmaps, corrective action plans, and/or project plans that lead to evolving or increasingly mature cybersecurity/privacy capabilities required to keep ahead of the advancing and evolving cyber threats may be included. The organization may therefore make fully informed risk-based mission/business decisions to create a cybersecurity/privacy mitigation strategy based on which actions can be mitigated and which can be accepted.

The integrated action plan may provide practical recommendations and guidance on how the organization can improve and mature the applicable core, category, or sub-category under the cybersecurity/privacy program. The proposed recommendations may be prioritized by their significant potential impact on the cybersecurity/privacy program from 1 to 4. As an example, priority 1 must be fixed immediately, priority 2 must be fixed within 30 days, priority 3 must be fixed within 6 months, and priority 4 must be fixed within 1 year. In some embodiments, the recommended mitigation strategies can be included in the appropriate cybersecurity/privacy strategic and tactical plans for resourcing and implementation.

In block 308, the enterprise may track remediation activities and changes to the cybersecurity/privacy program or project. For example, such tracking of remediation and changes may include collecting applicable artifacts/evidence, conducting and documenting applicable review and/or test activities to verify or validate remediation results, and modifying any roadmaps or corrective action plans as needed. To manage, document, and track remediation activities, the CS tool/component may include a reference document issued for each activity with an assigned severity level, assigned reference number, description of the finding, source of the finding, proposed solution, responsible person, resource requirements, target date, milestones, date completed, and next steps in the form of Plans of Actions and Milestones (POA&Ms). These remediation activities may be monitored based upon the selected finding and the associated corrective action plan. Thus, the CS tool/component in various embodiments may be used to assess the effectiveness of the organization's cybersecurity program or project by providing a high-level, strategic view of the lifecycle of the program or project, along with management of cybersecurity/privacy risks.

Figure 4A:
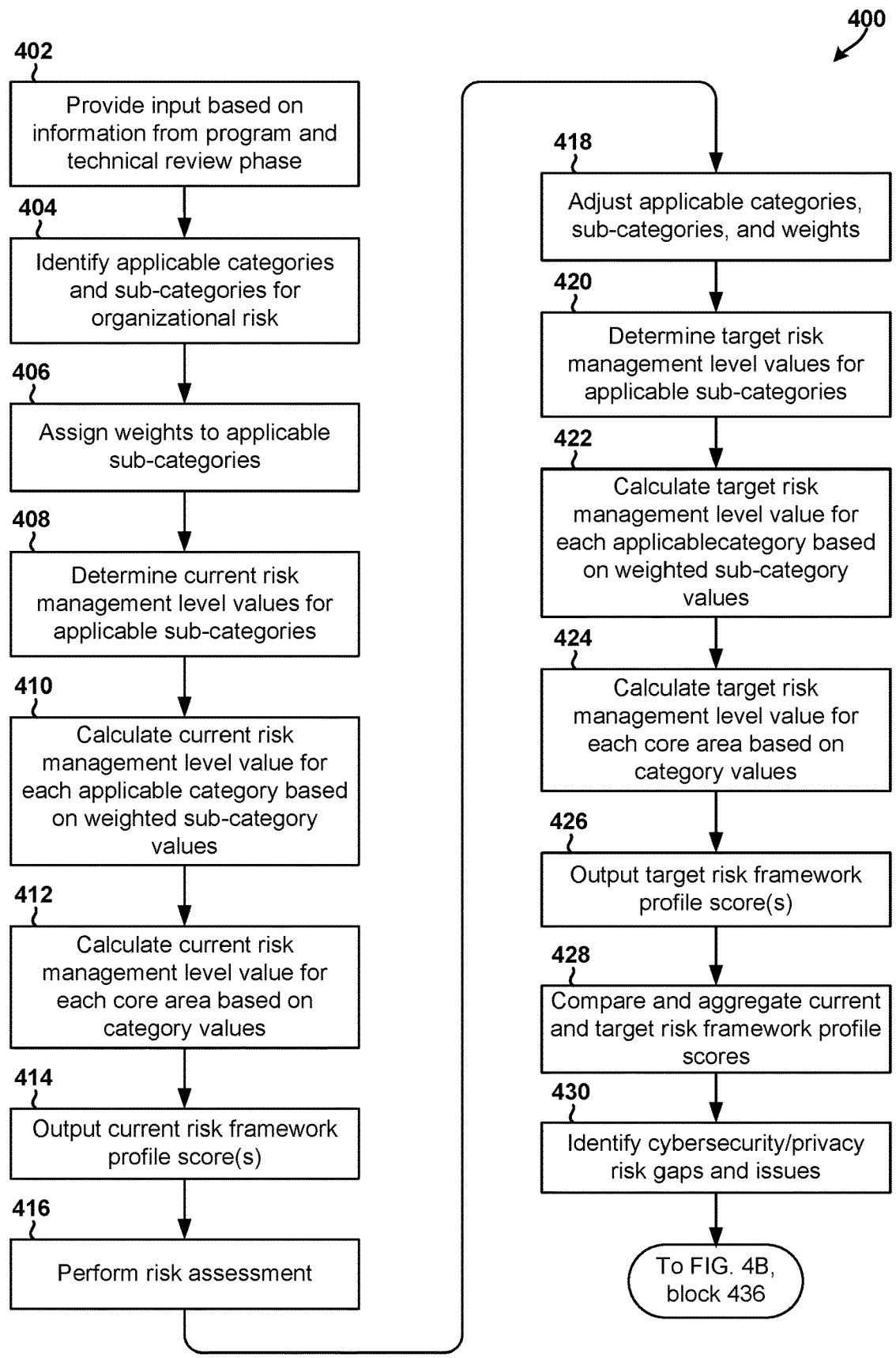
FIGS. 4A and 4B are process flow diagrams illustrating a method for performing the step of generating a cybersecurity/privacy risk framework profile or risk level and a maturity model assessment in FIG. 3.
Figure 4B:
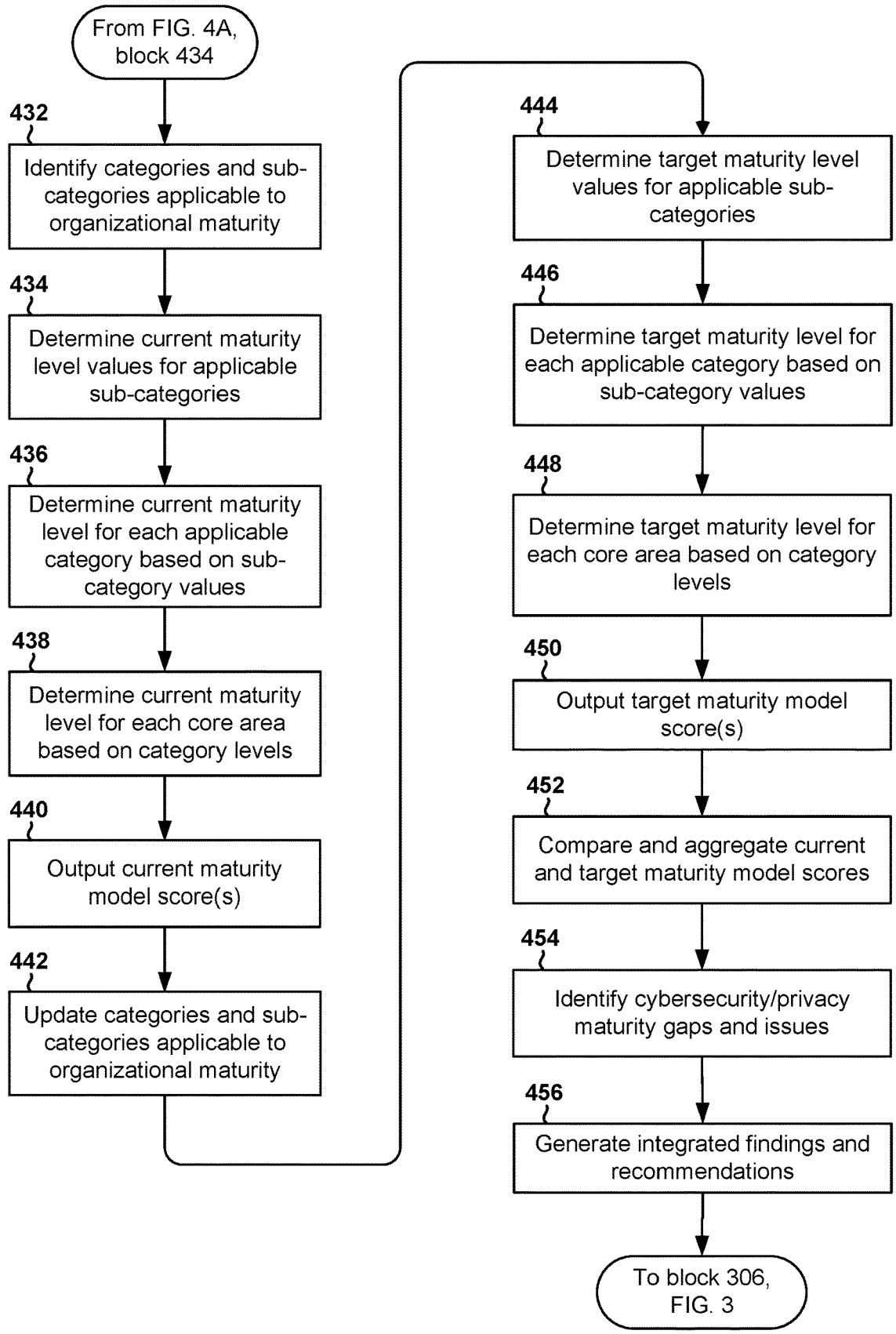

FIGS. 4A-4B illustrate an example method 400 for generating the cybersecurity/privacy risk framework profile and a maturity model assessment for block 304 of FIG. 3. In various embodiments, method 400 may be implemented on a processor or processing core of at least one computing device in the enterprise system configured to run the CS tool/component.

In block 402, the enterprise system may provide input to the CS tool/component based on information from the program and technical review phase. In particular, such input may include information derived from documentation reviews, targeted interviews, observations, technical vulnerability assessments/reviews and other relevant sources in the organization. Other input from the program and technical review phase may include, but is not limited to, any recorded measurement of a positive or negative environmental influences and constraints bearing on the cybersecurity/privacy program (e.g., budget and/or resource constraints, governance issue, etc.). In some embodiments, the input may include cybersecurity and privacy documentation review results, technical vulnerability assessment, blue team assessment, red team assessment, penetration testing team results, operational environmental description constraints, and/or targeted interview responses by personnel of the organization.

In block 404, the enterprise system may identify the categories and subcategories under each core area that are applicable to the organizational risk. That is, the cybersecurity/privacy goals and objectives vary between organizations and projects. Therefore, the enterprise system may identify, under each core area, any categories that should be excluded from the review, as well as any subcategories that should be excluded under each applicable category. In some embodiments, the applicability may be automatically determined by the enterprise system using the input from the program and technical review phase. For example, the presence or absence of a specific type of documentation, information from interviews or questionnaires of personnel, technical vulnerability assessment results, and other input may instruct the enterprise system as to applicability. In some embodiments, the enterprise system may generate an alert as to the need for additional information or documentation to determine applicability for one or more subcategory or category in response to detecting gaps in the program and technical review phase.

In block 406, the enterprise system may assign weights to the applicable subcategories within each category. That is, within a particular category, the subcategories being used for the assessment may be given a relative weighting factor based on importance, with the sum of all of the weighting factors under the category equal to 1. In some embodiments, the weight assigned to each subcategory may be based on information that is indicative of the organization's cybersecurity/privacy priorities (e.g., from background and other information derived from the program and technical review phase). In some embodiments, the enterprise system may be configured to weigh each applicable subcategory within a particular category equally by default.

The enterprise system may determine the current risk management level values for the applicable subcategories in block 408. In various embodiments, the subcategories may each include statements, questions, and/or criteria that are evaluated or answered with respect to the project under review. Specifically, under each applicable category, the enterprise system may determine a quantitative value that reflects the current state of the organization's cybersecurity/privacy program's risk management approach for each applicable subcategory. In some embodiments, the risk management level values may range from 0 to 4, with 0 being the lowest (e.g., "non-existent") and 4 being the highest (e.g., "adaptive"). In some embodiments, the determination of the current risk management level value may be based on the input from the program and technical review phase.

In block 410, the enterprise system may calculate a current risk management level value for each applicable category based on the weighted subcategory values. Specifically, the risk management level values for all of the subcategories under a particular category, and their respective weighting factors, may be combined to generate the risk management level value for that particular category. In some embodiments, the risk management level value an applicable category may be computed as a weighted average of its subcategory values.

In block 412, the enterprise system may calculate a current risk management level value for each core area based on the category values. That is, the current risk management level values for all of the applicable categories under a particular core area may be combined to generate the risk management level value for that core area, and repeated for all of the core areas within the CS tool/component. In some embodiments, the combination of the applicable category values may be computed as an average of such values.

In block 414, the enterprise system may output one or more current risk framework profile score(s) for the organization. In some embodiments, the current risk framework profile score(s) may include the risk management level values calculated in block 412 (e.g., across each of five core areas). In various embodiments, the current risk framework profile score(s) may include an overall current score that is calculated by combining (e.g., averaging, etc.) the current risk framework profile scores for all of the core areas. Following calculation of the current risk framework profile score(s), the enterprise system may perform a risk assessment of the organization's cybersecurity/privacy program in block 416. For example, the risk assessment may be an overall process or specific activities that analyze input about the operational environment to discern and likelihood of a cybersecurity/privacy event and/or its potential impact. Such risk assessment may be based on identified emerging risks and cyber threat information from internal and external sources.

In block 418, the enterprise system may adjust any of the applicable categories or subcategories, and/or subcategory weights for the organization's cybersecurity/privacy program. The adjustment may occur as needed within any of the core areas of the risk framework profile, based on the information from the risk assessment as well as input from the program and technical review phase regarding the organization's desired outcomes and/or unique priorities. In some embodiments, the adjustment may involve adding to, or removing from, the list of applicable categories and/or subcategories. Further, the adjustment may include developing new sub-subcategories and/or categories that can be added to the risk framework profile assessment based on the specific organization and risk assessment results. In this manner, the enterprise system may update, under each category, the identification of applicable subcategories, as well as the identification of applicable categories under each core area.

The enterprise system may determine target risk management level values for applicable subcategories in block 420. Specifically, under each applicable category, the enterprise system may determine a quantitative value (i.e., 0 to 4) for each subcategory that would cause a desired outcome within the category based on the updated weights, working from the organization's current and expected capabilities.

In block 422, the enterprise system may calculate a target risk management level value for each applicable category based on the weighted subcategory values. Specifically, the target risk management level values for the applicable subcategories under a particular category, and their respective updated weights, may be combined to generate the target risk management level value for that particular category. In block 424, the enterprise system may calculate a target risk management level value for each core area based on the category values computed in block 422.

In block 426, the enterprise system may output one or more target risk framework profile score(s) for the organization. In some embodiments, the target risk framework profile score(s) may include the risk management level values calculated in block 424 (e.g., across each of five core areas). In various embodiments, the target risk framework profile score(s) may include an overall target score that is calculated by combining (e.g., averaging) the target risk framework profile scores from all of the core and special activities areas.

In block 428, the enterprise system may compare the target risk framework profile score(s) to the current risk framework profile score(s) (e.g., from block 414), and aggregate the target and current risk framework profile scores. In block 430, the enterprise system may identify cybersecurity/privacy risk gaps and issues. In particular, the enterprise system may use the comparison between the current and target risk framework profile score(s) to identify gaps in in the organization's cybersecurity/privacy program or project, and use the aggregated current and target score(s) identify any real issues affecting the risk.

The method 400 may continue in FIG. 4B by developing a current cybersecurity/privacy maturity model. In block 432, the enterprise system may identify categories and subcategories applicable to the organizational maturity. Similar to the risk framework profile, since cybersecurity/privacy goals and objectives vary between organizations and projects. Therefore, the enterprise system may identify, under each core area, any categories that should be excluded from the review, as well as any subcategories that should be excluded under each applicable category.

In some embodiments, the identification of applicable categories and subcategories may be based on input from the program and technical review phase (i.e., from block 402), the current and/or target risk framework profile score(s) (i.e., from blocks 414 and/or 428), and any identified cybersecurity/privacy risk gaps or issues (i.e., from block 430).

The enterprise system may determine the current maturity level values for the applicable subcategories in block 434. Specifically, under each applicable category, the enterprise system may determine a quantitative value that reflects the current state of the organization's cybersecurity/privacy program's maturity for each applicable subcategory. In some embodiments, the maturity level values may range from 1 to 5, with 1 being the lowest (e.g., "ad-hoc") and 5 the highest (e.g., "optimized"). In some embodiments, the determination of the current maturity level value may be based on the input from the program and technical review phase, the current and/or target risk framework profile score(s), and/or any identified cybersecurity/privacy risk gaps or issues.

In block 436, the enterprise system may determine a current maturity level value for each applicable category based on the applicable subcategory values. Specifically, the maturity level values for all of the subcategories under a particular category may be combined to generate the current maturity level for that particular category. In some embodiments, the current maturity level for an applicable category may be determined based on the most frequently occurring maturity level value for the subcategories under that category.

In block 438, the enterprise system may determine a current maturity level for each core area based on the category values. That is, the current maturity levels for all of the applicable categories under a particular core area may be combined to generate the current maturity level for that core and special activities area, and repeated for all of the core and special activities areas within the CS tool/component.

For example, the combination of the applicable category values may be computed as the most frequently occurring value (i.e., mode) within the set, as the as the average of the category values, or using any other technique.

In block 440, the enterprise system may output one or more current maturity model score(s) for the organization. In some embodiments, the current maturity model score(s) may include the maturity levels determined in block 412 (e.g., across each of five core and special activities areas). In various embodiments, the current maturity model score(s) may include an overall current score that is calculated by combining the current maturity model scores for all of the core and special activities areas.

Following calculation of the current maturity model score(s), the enterprise system may update the applicable categories or subcategories for the organization's cybersecurity/privacy program in block 442. The adjustment may occur as needed within any of the core and special activities areas of the maturity model, based on the information from the risk framework profile as well as input from the program and technical review phase regarding the organization's projected goals, desired outcomes, and/or unique priorities. In some embodiments, the update may involve adding to, or removing from, the list of applicable categories and/or subcategories. Further, the adjustment may include developing new sub-subcategories and/or categories that can be added to the maturity model assessment based on the specific organization. In this manner, the enterprise system may update, under each category, the identification of applicable subcategories, as well as the identification of applicable categories under each core area. In block 444, the enterprise system may determine target maturity level values for applicable subcategories. Specifically, under each category, the enterprise system may determine a quantitative value (e.g., 1 to 5) for the applicable subcategories based on desired maturity level for that category and/or the particular core or special activity area.

In block 446, the enterprise system may determine a target maturity level for each applicable category based on the subcategory values.

Specifically, the target maturity level values for all of the subcategories of a particular category may be combined to generate the target risk management level value for that category. In block 448, the enterprise system may calculate a target maturity level for each core or special activity area based on the maturity levels determined in block 446.

In block 450, the enterprise system may output one or more target maturity model score(s) for the organization. In some embodiments, the target maturity model score(s) may include the target maturity levels for each of the core or special activity areas determined in block 448. In various embodiments, the target maturity model score(s) may include an overall target maturity model score that is calculated by combining the target maturity model scores from all of the core and special activity areas. For example, the overall maturity model score may be computed as the most frequently occurring score in the set of target maturity model scores across each of the core or special activity areas (i.e., mode), as the as the average of the core or special activity area values, or using any other technique.

In block 452, the enterprise system may compare the target maturity model score(s) to the current maturity model score(s) (e.g., from block 440), and aggregate the target and current maturity model scores. In block 454, the enterprise system may identify cybersecurity/privacy maturity gaps and issues. In particular, the enterprise system may use the comparison between the current and maturity model score(s)

to identify gaps in in the organization's cybersecurity/ privacy program or project, and use the aggregated current and target score(s) identify any real issues affecting the maturity.

In block 456, the enterprise system may generate integrated findings and recommendations for improvement for the organization's cybersecurity/privacy program or project. In some embodiments, the integrated findings and recommendations may be based on the gaps and issues for cybersecurity/privacy risk (i.e., from in block 430) and for maturity (i.e., from block 454). The enterprise system may proceed to block 306 in FIG. 3.

Figure 5:
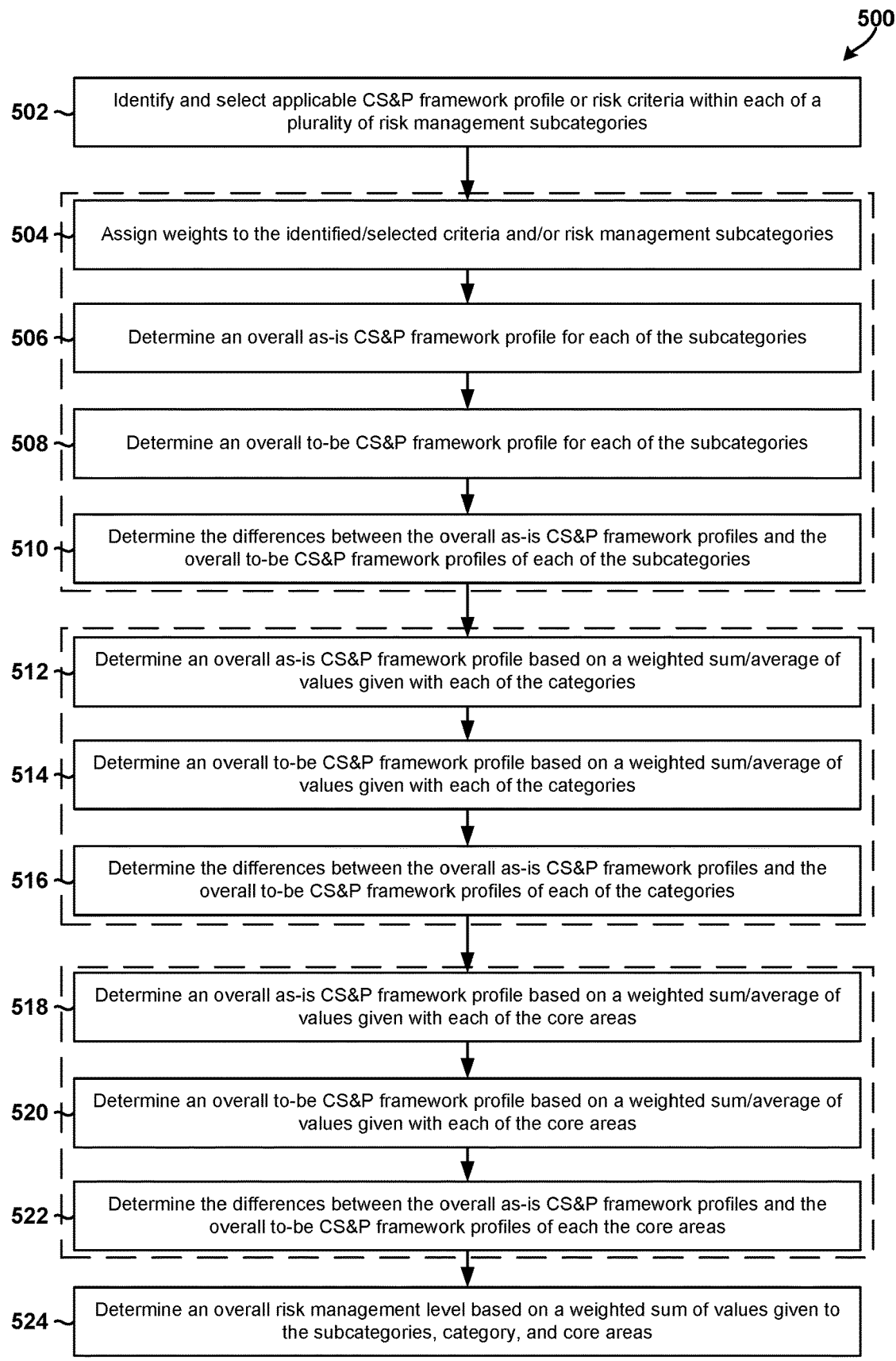
FIG. 5 is a process flow diagram illustrating a method of determining a framework profile in accordance with an embodiment.

FIG. 5 illustrates a method 500 of determining or computing a CS&P framework profile (or a risk factor, etc.) for a CS&P program in accordance with an embodiment. Method 500 may be implemented via a processor in a computing device of an enterprise system that configured to implement or run the CS tool/component.

In some embodiments, method 500 may be performed after collecting or receiving data inputs from or about an organization or CS&P program. In some embodiments, the data inputs may include CS&P documentation review results, technical vulnerability assessments (e.g., red/blue team assessments, penetration testing team results, etc.), operational environmental description influences and constraints, and/or targeted interview responses by the personnel of the organization. In various embodiments, the data inputs may be collected from annual organizational FISMA and CyberScope reporting documents, from CS&P program reviews, from the organization, etc.

In block 502, the processor may identify and select applicable CS&P framework profile and/or risk criteria (data points, data inputs, etc.) within each of a plurality of risk management subcategories. In some embodiments, a user or client device may specify the CS&P framework profile and/or risk criteria that are to be selected within the plurality of risk management subcategories in block 502.

The risk criteria may include individual items at the "subcategory level" under the "category level," and which may be aggregated at the applicable subcategory level. As an example, the risk criteria selected in block 502 may include individual subcategory items that have been selected for review, weighting, and scoring by the client/user. The risk management subcategories may be divided among a plurality of risk management categories and/or among a plurality of core areas (e.g., identify, protect, detect, respond, recover, etc.). In an embodiment, each core area may include two or more categories, and each category may include two or more sub-categories. In some embodiments, the risk criteria may be aggregated at the applicable subcategory level.

In block 504, the processor may assign weights to the identified/selected risk criteria at the subcategory level. The processor may assign the weights so that the sum of all the weights assigned to the risk management sub-categories within each category and functional/core areas equals one (1). For example, the processor may determine that the first-third subcategories are distributed across a first category (e.g., the "Identify, Asset Management and Authorization" category), and that the third and fifth subcategories are distributed across a second category (e.g., the "Identify, Business Environment" category). The processor may assign a weight of 0.2 to a first subcategory, 0.5 to a second subcategory, 0.3 to a third subcategory, 1.0 to a forth subcategory, and 0.7 to a fifth subcategory. The processor may compute the sum of the weights of the subcategories in the first category as 0.2+0.5+0.3=1. The processor may compute the sum of the weights of the subcategories in the second category as 0.3+0.7=1.

In block 506, the processor may determine or compute an overall as-is CS&P framework profile for each of the risk management subcategories. For example, the processor may determine that the overall as-is CS&P framework profile for the first subcategory is "3", the overall as-is CS&P framework profile for the second subcategory is "4," the overall as-is CS&P framework profile for the third subcategory is "1," etc.

In block 508, the processor may determine or compute an overall to-be CS&P framework profile for each of the risk management subcategories. For example, the processor may determine that the overall to-be CS&P framework profile for the first subcategory is "4", the overall to-be CS&P framework profile for the second subcategory is "4," the overall to-be CS&P framework profile for the third subcategory is "3," etc.

In block 510, the processor may determine or compute the differences between the overall as-is CS&P framework profiles and the overall to-be CS&P framework profiles of each the subcategories. For example, the processor may determine that the difference for the first subcategory is "1", the difference for the second subcategory is "0," the overall to-be CS&P framework profile for the third subcategory is "2," etc. If the difference value is a negative result, the processor/system may flag it for review (since it may indicate that organizational resources are being expended that should or could be applied elsewhere).

In block 512, the processor may determine or compute an overall as-is CS&P framework profile for the CS&P program based on a weighted sum/average of values given with each of a plurality of risk management categories.

In block 514, the processor may determine or compute an overall to-be CS&P framework profile or risk level for the CS&P program based on a weighted sum/average of values given with each of a plurality of risk management categories.

In block 516, the processor may determine or compute the differences between the overall as-is CS&P framework profiles and the overall to-be CS&P framework profiles of each the of a plurality of risk management categories.

In block 518, the processor may determine or compute an overall as-is CS&P framework profile for the CS&P program based on a weighted sum/average of values given with each of the core areas.

In block 520, the processor may determine or compute an overall to-be CS&P framework profile or risk level for the CS&P program based on a weighted sum/average of values given with each of the core areas.

In block 522, the processor may determine or compute the differences between the overall as-is CS&P framework profiles and the overall to-be CS&P framework profiles of each the core areas.

In block 524, the processor may determine or compute an overall risk management level based on a weighted sum of values given to the subcategories, category, and core areas.

Figure 6:
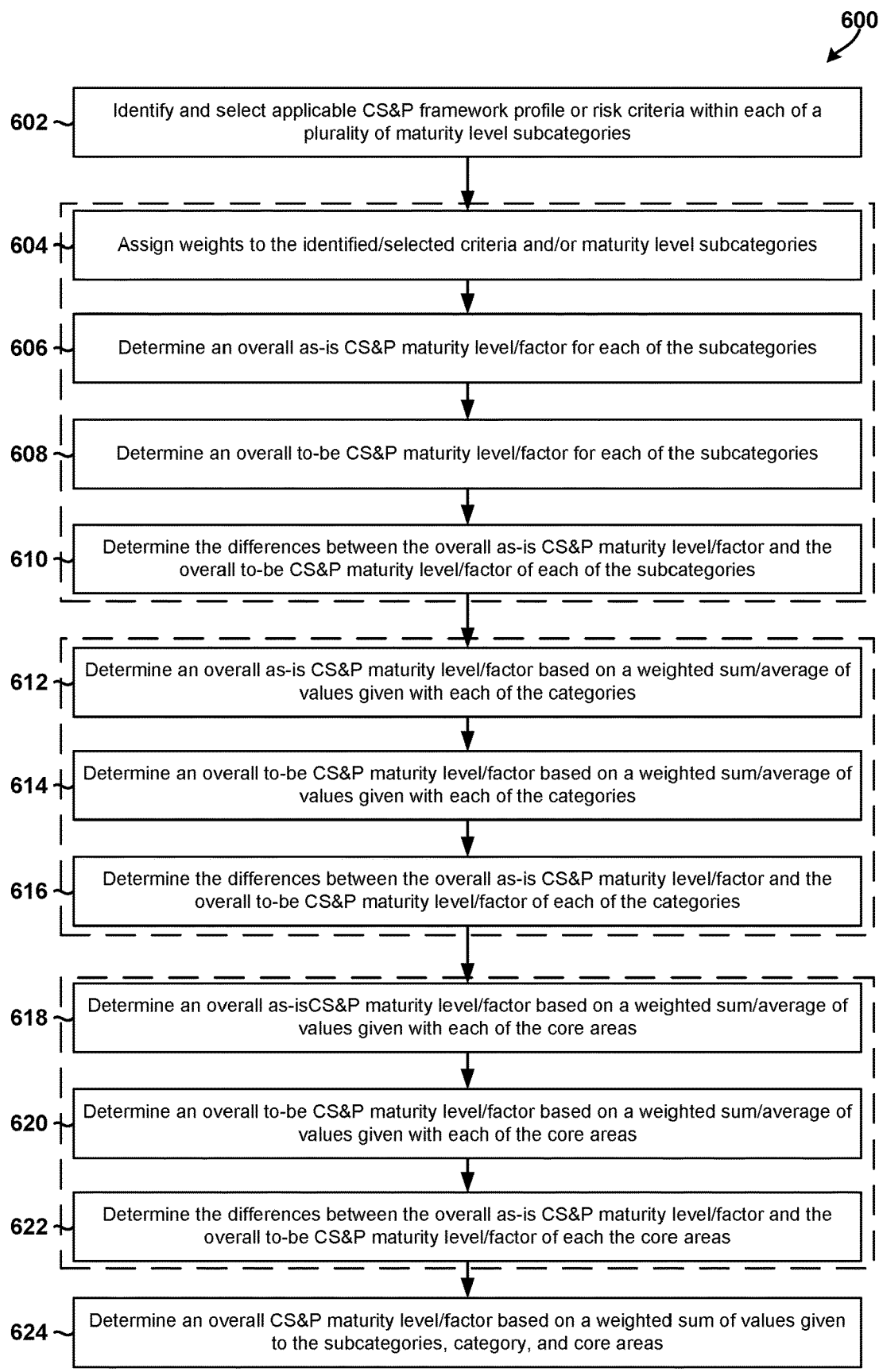
FIG. 6 is a process flow diagram illustrating a method of determining a maturity level in accordance with an embodiment.

FIG. 6 illustrates a method 600 of determining or computing a CS&P maturity level for a CS&P program in accordance with an embodiment. Method 600 may be implemented via a processor in a computing device of an enterprise system that configured to implement or run the CS tool/component. The operations in blocks 602 through 624 are similar to those described above with reference to blocks 502 through 524, except that maturity values (e.g., on a scale of 1-5, etc.) are used to compute an overall maturity level based on the weighted sum of values given to the subcategories, category, and core areas.

Figure 7:
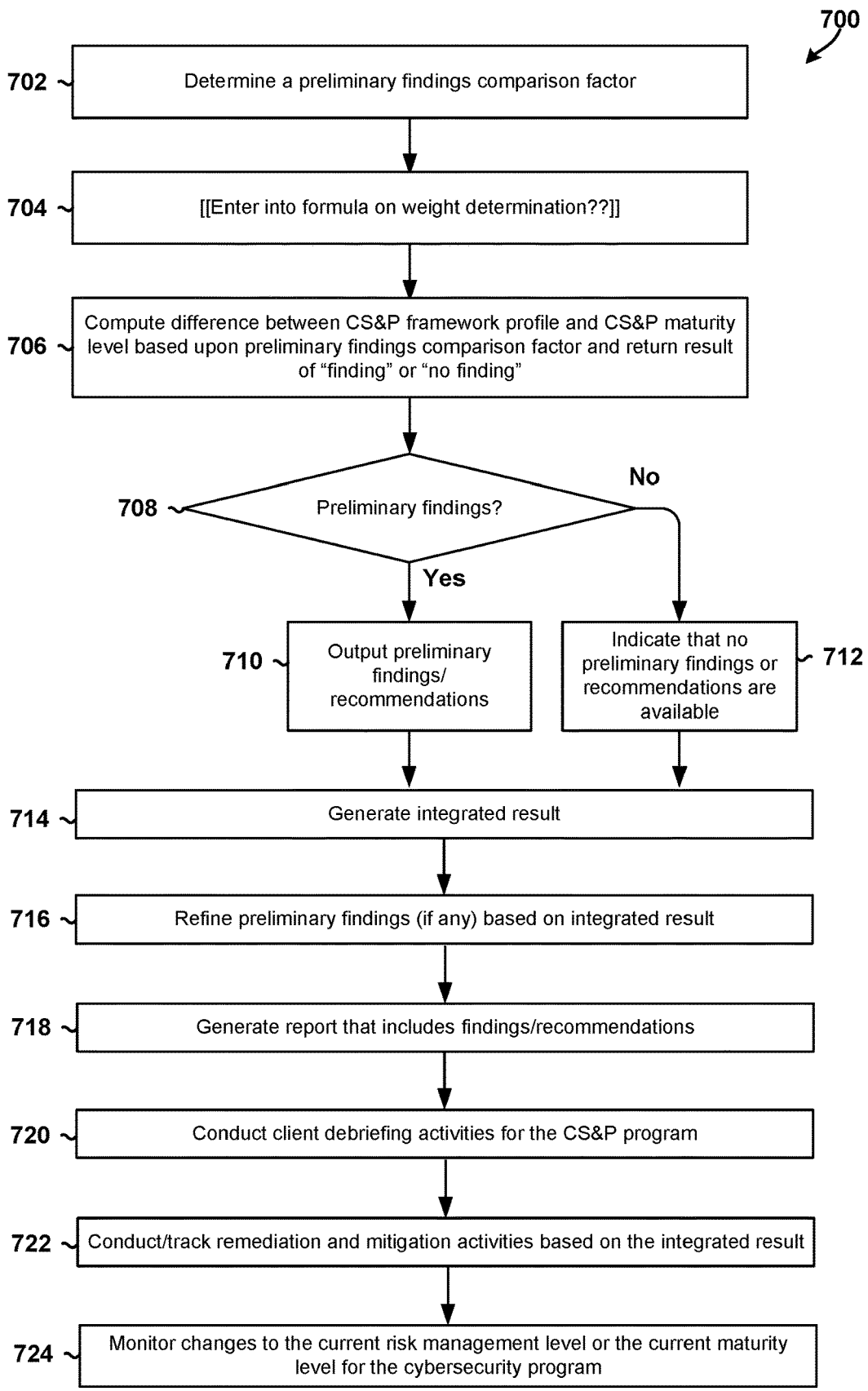
FIG. 7 is a process flow diagram illustrating a method of determining potential findings and recommendations based upon framework profile and maturity level differences in accordance with an embodiment.

FIG. 7 illustrates a method 700 of determining potential findings and recommendations based upon CS&P framework profile and maturity level differences in accordance with an embodiment. Method 700 may be implemented via a processor in a computing device of an enterprise system that configured to implement or run the CS tool/component.

In block 702, the processor may determine the preliminary findings comparison factor. In some embodiments, the preliminary findings comparison factor may be determined based upon the stated organizational risk tolerance/appetite.

In block 704, the preliminary findings comparison factor may be used to determine the weights that are to be applied to the subcategories, categories and/or core areas to determine preliminary findings. In an embodiment, the preliminary findings comparison factor may a value between zero (0) and five (5). In an embodiment, the preliminary findings comparison factor may be set to one (1) by default.

In block 706, the processor may compute the difference between CS&P framework profile and CS&P maturity level based upon preliminary findings comparison factor and return result of "Finding" or "No Finding." In determination block 708, the processor may determine whether findings are available based on the comparison result.

In response to determining that findings are available (i.e., determination block 708="Yes"), the processor may generate and output the preliminary findings in block 710. The processor may then generate and/or use an integrated result to refine the preliminary findings, conduct a risk assessment based on the refined findings, develop formal findings, and generate a report that includes recommendations for improvements to the CS&P program. The processor may also generate preliminary recommendations and/or analysis information in block 710, which may be used to determine weight values, inform the organization of the status of their evaluated CS&P program, to generate an action plan or roadmap, and/or to perform various actuation operations to improve the program or mitigate risks.

In response to determining that the comparison did not return a result of "finding" (i.e., determination block 708="No"), in block 712, the processor may indicate that no preliminary findings are available. For example, the processor may cause an electronic display of the computing device to display "no preliminary findings or recommendations are available."

In block 714, the processor may determine an integrated result for the CS&P program based, at least in part, on a combination of the overall risk management level (determined in block 524) and the overall maturity level (determined in block 624). In some embodiments, the processor may generate the integrated result to include recommendations for improvements to the CS&P program.

In block 716, the processor may refine preliminary findings (if any), update the recommendations, and output the result.

In block 718, the processor may perform risk assessment operations for each potential findings, develop formal findings and mitigation and/or remediation strategies, and develop initial draft report.

In block 720, the processor may generate output and/or perform various operations to enable conducting client debriefing activities for the CS&P program, coordination and presentation of draft initial report, briefing of initial draft report findings and mitigation and/or remediation strategies, initial draft report review, comment and clarification, reconcile and review of initial draft report based on feedback, review and approval of revised report, etc.

In block 722, the processor may generate output and/or perform various operations to enable conducting or tracking remediation and mitigation activities based on the integrated result, which may include identifying, analyzing, conducting and/or managing remediation and mitigation activities. These operations may also include reviewing, updating, and providing the final report and out brief to the organization.

In block 724, the processor may monitor changes to the current risk management level or the current maturity level for the cybersecurity/privacy program, which may include conducting reviews based upon changes to program, project, system, and/or operational environments (as necessary), and conducting "what-if" planning support.

Figure 8:
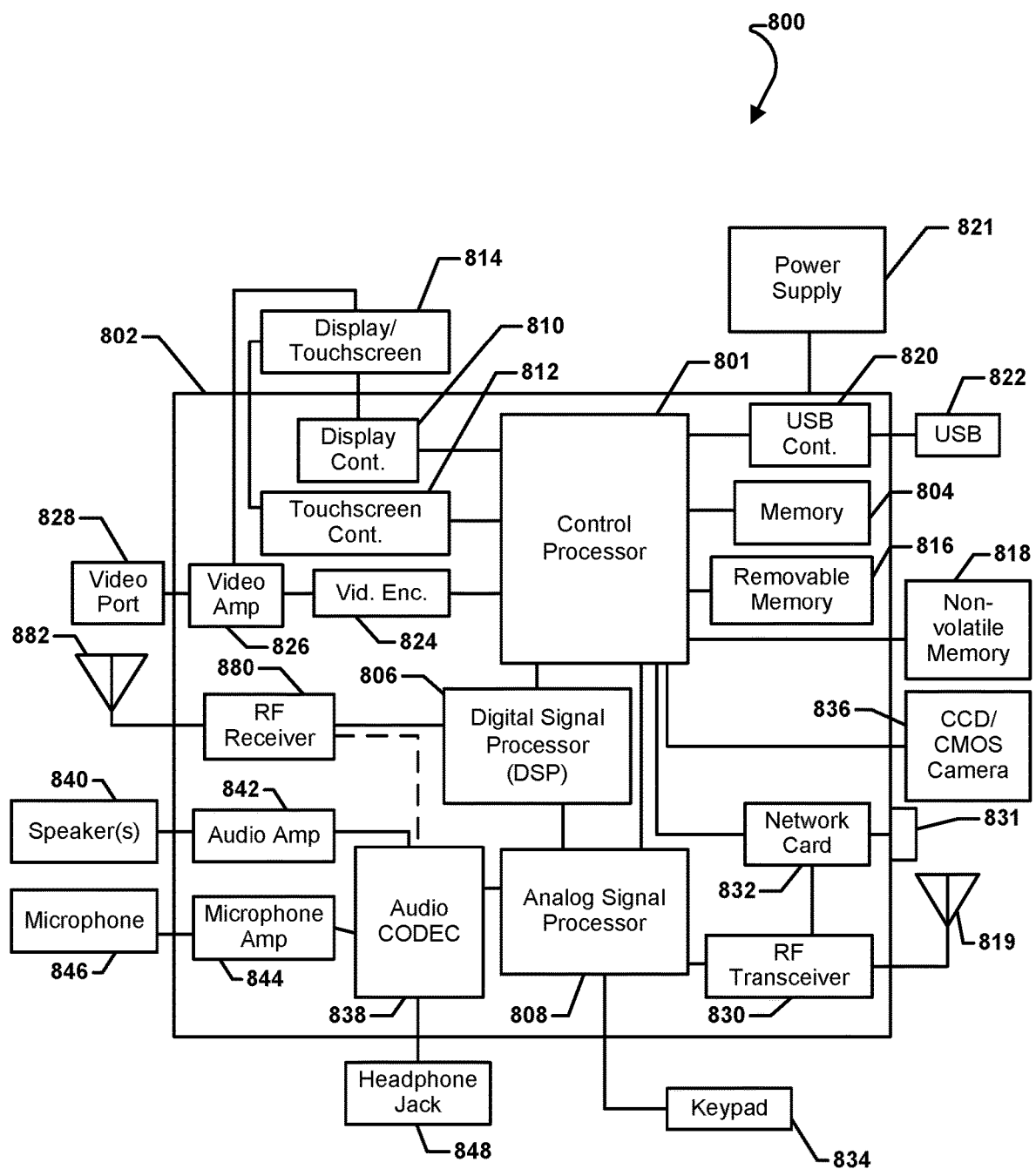
FIG. 8 is a component block diagram of a computing device or suitable for use with various embodiments.

Example components and modules of an exemplary, non-limiting embodiment of a computing device equipped with applications (server or service) suitable for use with various embodiments is illustrated in FIG. 8. A computing device 800 may include a circuit board 802 of electronic components, some or all of which may be integrated into an on-chip system, that includes a control processor 801 coupled to memory 804. The control processor 801 may further be coupled to a digital signal processor 806 and/or an analog signal processor 808, which also may be coupled together. In some embodiments, the control processor 801 and a digital signal processor 806 may be the same component or may be integrated into the same processor chip. A display controller 810 and a touchscreen controller 812 may be coupled to the control processor 801 and to a display/touchscreen 814 within or connected to the computing device 102.

The control processor 801 may also be coupled to removable memory 816 (e.g., an SD memory or SIM card in the case of mobile computing devices) and/or to external memory 818, such as one or more of a disk drive, CD drive, and a DVD drive. The control processor 801 may also be coupled to a Universal Serial Bus (USB) controller 820 that couples to a USB port 822. In various embodiments, a power supply 821 may be coupled to the circuit board 802 through the USB controller 820 or through different electrical connections to provide power (e.g., DC power) to the various electronic components.

The control processor 801 may further be coupled to a network card 832 which may be coupled to a network connector 831 and/or the RF transceiver 830 and configured to enable communications via an external network (e.g., local area networks, the Internet, an intranet, WiFi networks, Bluetooth networks, personal area network (PAN) etc.). The network card 832 may be in the form of a separate chip or card, or may be implemented as part of the control processor 801 or the RF transceiver 830 (or both) as a full solution communication chip.

A number of analog devices may be coupled to the control processor 801 via the analog signal processor 808, such as a keypad 834. In other implementations, a keypad or keyboard may include its own processor so that the interface with the control processor 801 may be via direct connection (not shown), via a network connection (e.g., via the network card), or via the USB port 822.

In an embodiment, processor-executable instructions for accomplishing one or more of the method operations described above may be stored in the internal memory 804, removable memory 816 and/or non-volatile memory 818 (e.g., as on a hard drive, CD drive, or other storage accessible via a network). Such processor-executable instructions may be executed by the control processor 801 in order to perform the methods described herein.

Figure 9:
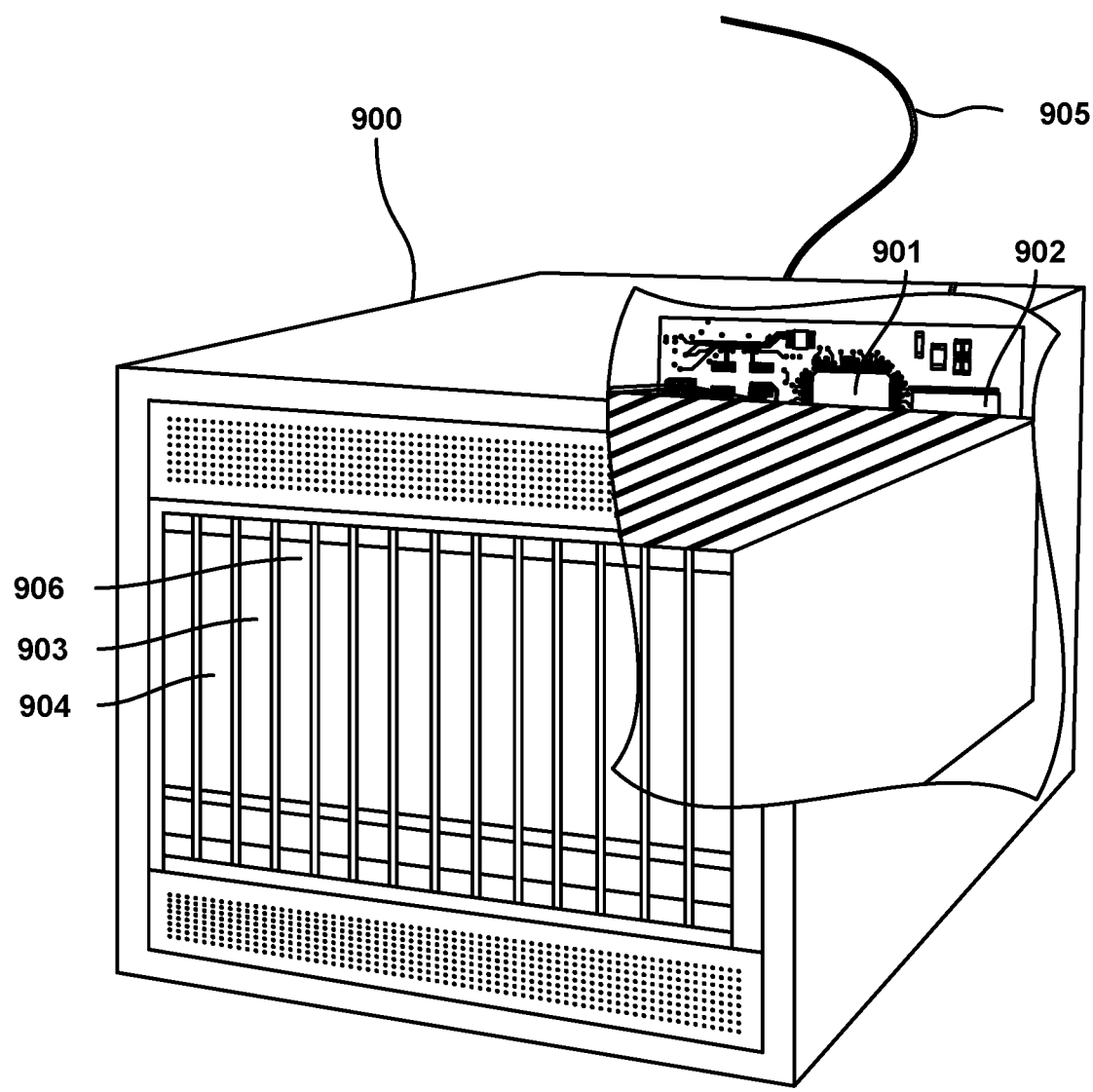
FIG. 9 is a block diagram of a server device suitable for use with various embodiments.

The embodiments and enterprise systems described above may be implemented in variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing data connections 905 with a network, such as a local area network coupled to other communication system computers and servers.

The processors 801, 901, may be any programmable microprocessor, microcomputer or multiple processor chip or chips that can be configured by software instructions (applications) to perform a variety of functions, including the functions of the various embodiments described below. In some client computing devices, multiple processors may be provided, such as one processor dedicated to wireless communication functions and one processor dedicated to running other applications. Typically, web application usage may be stored in the internal memory before they are accessed and loaded into the processor. Each processor may include internal memory sufficient to store the application software instructions. In some servers, the processor may include internal memory sufficient to store the application software instructions. In some receiver devices, the secure memory may be in a separate memory chip coupled to the processor. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor.

As used in this application, the terms "component," "module," "tool," "system" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A computing device comprising:
   a memory; and
   a processor coupled to the memory, wherein the processor is configured with processor executable software instructions to perform operations comprising:
      implement an automated supervised learning comprising:
         monitoring technical activities of an organization to collect technical activity information;
         generating feature vector information structures based on the collected technical activity information;
         applying the generated feature vector information structures to machine learning models to generate analysis results; and
         using the generated analysis results to assign risk management level scores in one or more domains, wherein each domain includes:
            a core area comprising a plurality of categories,
            a category comprising a plurality of subcategories, and
            a subcategory;
      determining a cybersecurity and privacy (CS&P) framework profile for a cybersecurity program implemented by the organization;
      determining a CS&P maturity level for the cybersecurity program;
      determining an integrated result for the cybersecurity program based on a combination of the determined CS&P framework profile and the determined CS&P maturity level; and
      using the determined integrated result to:
         generate a corrective action plan that includes one or more remediation activities;
         invoke the remediation activities; and
         monitor the remediation activities, changes to a current risk management level of cybersecurity program, and changes to a current maturity level the cybersecurity program.

2. The computing device of claim 1,
   wherein the processor is configured to perform operations such that determining the CS&P framework profile for the cybersecurity program implemented by the organization comprises:
      determining the current risk management level for the cybersecurity program; and
      determining a target risk management level for the cybersecurity program; and
   wherein the processor is configured to perform operations such that determining the CS&P maturity level for the cybersecurity program comprises:
      determining the current maturity level for the cybersecurity program; and
      determining a target maturity level for the cybersecurity program.

3. The computing device of claim 1, wherein the processor is configured to perform operations such that:
   determining the CS&P framework profile for the cybersecurity program implemented by the organization comprises determining the current risk management level and a target risk management level within each of a plurality of core areas, wherein each core area includes an identify core area information structure, a protect core area information structure, a detect core area information structure, a respond core area information structure, and a recover core area information structure; and
   determining the CS&P maturity level for the cybersecurity program comprises determining the current maturity level and a maturity level within each of the plurality of core areas.

4. The computing device of claim 1, wherein the processor is configured to perform operations further comprising:
   using the integrated result to generate recommendations for improvements to the cybersecurity program.

5. The computing device of claim 1, wherein the processor is configured to perform operations such that determining the CS&P framework profile for the cybersecurity program implemented by the organization comprises:
   identifying applicable criteria within each of a plurality of subcategories, wherein the subcategories comprise criteria relevant to risk management; and
   assigning a weight to the identified criteria under the plurality of subcategories.

6. The computing device of claim 5, wherein the processor is configured to perform operations such that the subcategories are divided among a plurality of categories, and wherein a sum of the weights assigned to the subcategories within each category equals 1.

7. The computing device of claim 6, wherein the processor is configured to perform operations such that determining the CS&P framework profile for the cybersecurity program implemented by the organization comprises:
   determining a risk management level for each category based on a weighted sum of values given to the subcategories within the category.

8. The computing device of claim 1,
   wherein the processor is configured to perform operations such that determining the CS&P maturity level for the cybersecurity program comprises:
      identifying applicable criteria within each of a plurality of subcategories,
   wherein the plurality of subcategories comprise criteria relevant to maturity of the cybersecurity program, and
   wherein the subcategories are divided among a plurality of categories.

9. The computing device of claim 1, wherein:
   the processor is configured to perform operations further comprising receiving data input from the organization, and
   the processor is configured to perform operations such that:
      determining the CS&P framework profile for the cybersecurity program implemented by the organization comprises using the received data input from the organization to determine the CS&P framework profile; and
      determining the CS&P maturity level for the cybersecurity comprises using the received data input from the organization to determine the CS&P maturity level for the cybersecurity.

10. The computing device of claim 9, wherein the processor is configured to perform operations such that the received data input includes information comprising at least one of cybersecurity documentation, technical vulnerability assessment results, blue team assessment, red team assessment, penetration testing team results, operational environmental constraints, or targeted interview responses by personnel of the organization.

11. A method of evaluating a cybersecurity program implemented by an organization, comprising:
  implementing an automated supervised learning comprising:
    monitoring technical activities of the organization to collect technical activity information;
    generating feature vector information structures based on the collected technical activity information;
    applying the generated feature vector information structures to machine learning models to generate analysis results; and
    using the generated analysis results to assign risk management level scores in one or more domains, wherein each domain includes:
      a core area comprising a plurality of categories,
      a category comprising a plurality of subcategories, and
      a subcategory;
  determining a cybersecurity and privacy (CS&P) framework profile for the cybersecurity program;
  determining a CS&P maturity level for the cybersecurity program;
  determining an integrated result for the cybersecurity program based on a combination of the determined CS&P framework profile and the determined CS&P maturity level; and
  using the determined integrated result to:
    generate a corrective action plan that includes one or more remediation activities;
    invoke the remediation activities; and
    monitor the remediation activities, changes to a current risk management level of cybersecurity program, and changes to a current maturity level the cybersecurity program.

12. The method of claim 11, wherein:
  determining the CS&P framework profile for the cybersecurity program comprises:
    determining the current risk management level for the cybersecurity program; and
    determining a target risk management level for the cybersecurity program; and
  determining the CS&P maturity level for the cybersecurity program comprises:
    determining the current maturity level for the cybersecurity program; and
    determining a target maturity level for the cybersecurity program.

13. The method of claim 11, wherein:
  determining the CS&P framework profile for the cybersecurity program comprises determining the current risk management level and target risk management level within each of a plurality of core areas, wherein each core area includes a an identify core area information structure, a protect core area information structure, a detect core area information structure, a respond core area information structure, and a recover core area information structure; and
  determining the CS&P maturity level for the cybersecurity program comprises determining the current maturity level and a maturity level within each of the plurality of core areas.

14. The method of claim 11, further comprising:
  using the integrated result to generate recommendations for improvements to the cybersecurity program.

15. The method of claim 11, wherein determining the CS&P framework profile for the cybersecurity program comprises:
  identifying applicable criteria within each of a plurality of subcategories, wherein the subcategories comprise criteria relevant to risk management; and
  assigning a weight to the identified criteria under the plurality of subcategories.

16. The method of claim 15, wherein the subcategories are divided among a plurality of categories, and wherein a sum of the weights assigned to the subcategories within each category equals 1.

17. The method of claim 16, wherein determining the CS&P framework profile for the cybersecurity program comprises:
  calculating a risk management level for each category based on a weighted sum of values given to the subcategories within the category.

18. A non-transitory processor-readable medium having stored thereon processor-executable instructions to cause a processor of a computing device to perform operations for evaluating a cybersecurity program implemented by an organization, the operations comprising:
  implementing an automated supervised learning comprising:
    monitoring technical activities of the organization to collect technical activity information;
    generating feature vector information structures based on the collected technical activity information;
    applying the generated feature vector information structures to machine learning models to generate analysis results; and
    using the generated analysis results to assign risk management level scores in one or more domains, wherein each domain includes:
      a core area comprising a plurality of categories,
      a category comprising a plurality of subcategories, and
      a subcategory;
  determining a cybersecurity and privacy (CS&P) framework profile for the cybersecurity program;
  determining a CS&P maturity level for the cybersecurity program;
  determining an integrated result for the cybersecurity program based a combination of the determined CS&P framework profile and the determined CS&P maturity level; and
  using the determined integrated result to:
    generate a corrective action plan that includes one or more remediation activities;
    invoke the remediation activities; and
    monitor the remediation activities, changes to a current risk management level of cybersecurity program, and changes to a current maturity level the cybersecurity program.

* * * * *